United States Patent [19]

Hare, Sr.

[11] Patent Number: 5,103,779

[45] Date of Patent: * Apr. 14, 1992

[54] ELECTRO-RHEOLOGICAL VALVE CONTROL MECHANISM

[76] Inventor: Nicholas S. Hare, Sr., 252 Pineville Rd., Monroeville, Ala. 36460

[ * ] Notice: The portion of the term of this patent subsequent to Jun. 5, 2007 has been disclaimed.

[21] Appl. No.: 625,115

[22] Filed: Dec. 10, 1990

Related U.S. Application Data

[63] Continuation-in-part of Ser. No. 533,733, Jun. 5, 1990, abandoned, which is a continuation-in-part of Ser. No. 399,178, Aug. 29, 1989, Pat. No. 4,930,463, which is a continuation-in-part of Ser. No. 339,748, Apr. 18, 1989, abandoned.

[51] Int. Cl.$^5$ .......................... F01L 1/34; F01L 9/02; F01L 9/04

[52] U.S. Cl. .............................. 123/90.11; 123/90.16; 123/90.6; 123/90.48; 123/182.1; 123/321; 123/90.12; 74/568 R

[58] Field of Search ............... 123/90.11, 90.12, 90.15, 123/90.16, 90.48, 90.49, 90.51, 90.6, 90.52, 182, 321; 74/567, 568 R

[56] References Cited

U.S. PATENT DOCUMENTS

| | | | |
|---|---|---|---|
| 2,778,259 | 1/1957 | Moir | 81/301 |
| 3,047,507 | 7/1962 | Winslow | 252/75 |
| 3,277,874 | 8/1965 | Wagner | 123/90.16 |
| 3,304,925 | 6/1966 | Rhoads | 123/90.55 |
| 3,367,872 | 2/1968 | Martinek | 252/74 |
| 3,381,676 | 5/1968 | Campen | 123/182 |
| 3,395,689 | 8/1968 | Kruse | 123/182 |
| 3,490,423 | 1/1970 | Shunta et al. | 123/90.16 |
| 3,511,219 | 5/1970 | Esty | 123/182 |
| 3,682,152 | 8/1972 | Muller-Berner | 123/90.11 |
| 3,742,921 | 4/1973 | Rendine | 123/90.16 |
| 3,786,792 | 1/1974 | Pelizzoni et al. | 123/90.17 |
| 3,809,033 | 5/1974 | Cartledge | 123/90.46 |
| 3,817,228 | 6/1974 | Bywater | 123/90.12 |
| 3,865,088 | 2/1975 | Links | 123/90.12 |
| 3,964,455 | 6/1976 | Brown | 123/90.43 |
| 4,009,695 | 3/1977 | Ule | 123/90.13 |

(List continued on next page.)

FOREIGN PATENT DOCUMENTS

| | | | |
|---|---|---|---|
| 3631107 | 3/1988 | Fed. Rep. of Germany | 188/267 |
| 221034 | 12/1983 | Japan | 188/267 |
| 968534 | 11/1982 | U.S.S.R. | 188/267 |
| 756107 | 8/1956 | United Kingdom | 188/267 |
| 1282568 | 7/1972 | United Kingdom | 188/267 |

OTHER PUBLICATIONS

"ER Fluid Devices Near Commercial Stage", Scott & Yamaguchi, Automotive Engineering, Nov. 1985.
"Electro-Rheological Fluids and Devices", Automotive Engineering, Dec. 1988.
"Inventors: Got a Use for Liquid that Turns Solid?", Douglas Williams, Automotive Industries, vol. 167, Jan. 1989.

*Primary Examiner*—E. Rollins Cross
*Assistant Examiner*—Weilun Lo
*Attorney, Agent, or Firm*—Ferrill and Logan

[57] ABSTRACT

An electro-rheological valve controller. The invention comprises a generally cylindrical casing holding an electro-rheological fluid; a reciprocating tappet attached at one end of the cylindrical casing, said tappet contacting cam means for thrusting said tappet into said casing toward a reciprocating valve lift member; a plunger member coupled to said tappet, said plunger being perforated to permit the flow of electro-rheological fluid therethrough; a reciprocating valve lift member situated within said casing and separated from said perforated plunger member by a biasing spring and said electro-rheological fluid, said lift member communicating with a valve to be lifted; and electrode means coupled to said perforated member for generating an electric field within said perforated member such that said electro-rheological fluid within said perforated member solidifies, whereby said plunger applies a compressive fluid force against said reciprocating lift member thereby lifting said valve to be lifted. In an alternative embodiment, the unique electrode configurations of the present invention are utilized in a valve controller with a by-pass conduit.

15 Claims, 16 Drawing Sheets

U.S. PATENT DOCUMENTS

| | | | |
|---|---|---|---|
| 4,033,892 | 7/1977 | Stangroom | 242/76 |
| 4,133,332 | 1/1979 | Benson et al. | 123/90.16 |
| 4,134,371 | 1/1979 | Hausknecht | 123/90.43 |
| 4,151,817 | 5/1979 | Mueller | 123/90.16 |
| 4,161,306 | 7/1979 | Brune et al. | 123/32 AB |
| 4,203,397 | 5/1980 | Soeters, Jr. | 122/90.16 |
| 4,258,671 | 3/1981 | Takizawa et al. | 122/90.16 |
| 4,284,042 | 8/1981 | Springer | 123/198 F |
| 4,321,894 | 3/1982 | Black | 123/90.52 |
| 4,393,832 | 7/1983 | Samuel et al. | 123/90.14 |
| 4,442,806 | 4/1984 | Matsuura et al. | 123/198 F |
| 4,444,298 | 4/1984 | Stangroom | 192/21.5 |
| 4,452,187 | 6/1984 | Kosuda et al. | 123/90.16 |
| 4,466,390 | 8/1984 | Babitzka et al. | 123/90.16 |
| 4,485,780 | 12/1984 | Price et al. | 123/90.15 |
| 4,493,615 | 1/1985 | Stangroom | 417/48 |
| 4,515,121 | 5/1985 | Matsuura et al. | 123/198 F |
| 4,515,343 | 5/1985 | Pischinger et al. | 123/90.11 |
| 4,593,658 | 6/1986 | Moloney | 123/90.11 |
| 4,700,678 | 10/1987 | Elliott | 123/297 |
| 4,744,914 | 5/1988 | Filisko et al. | 252/74 |
| 4,765,288 | 8/1988 | Linder et al. | 123/90.16 |
| 4,772,407 | 9/1988 | Carlson | 252/74 |
| 4,840,112 | 6/1989 | Bhadra et al. | 91/459 |
| 4,858,733 | 8/1989 | Noguchi et al. | 188/267 |
| 4,892,067 | 1/1990 | Paul et al. | 123/90.12 |
| 4,909,198 | 3/1990 | Shiraya et al. | 123/90.51 |
| 4,930,463 | 6/1990 | Hare, Sr. | 123/90.11 |

SEC. A-A

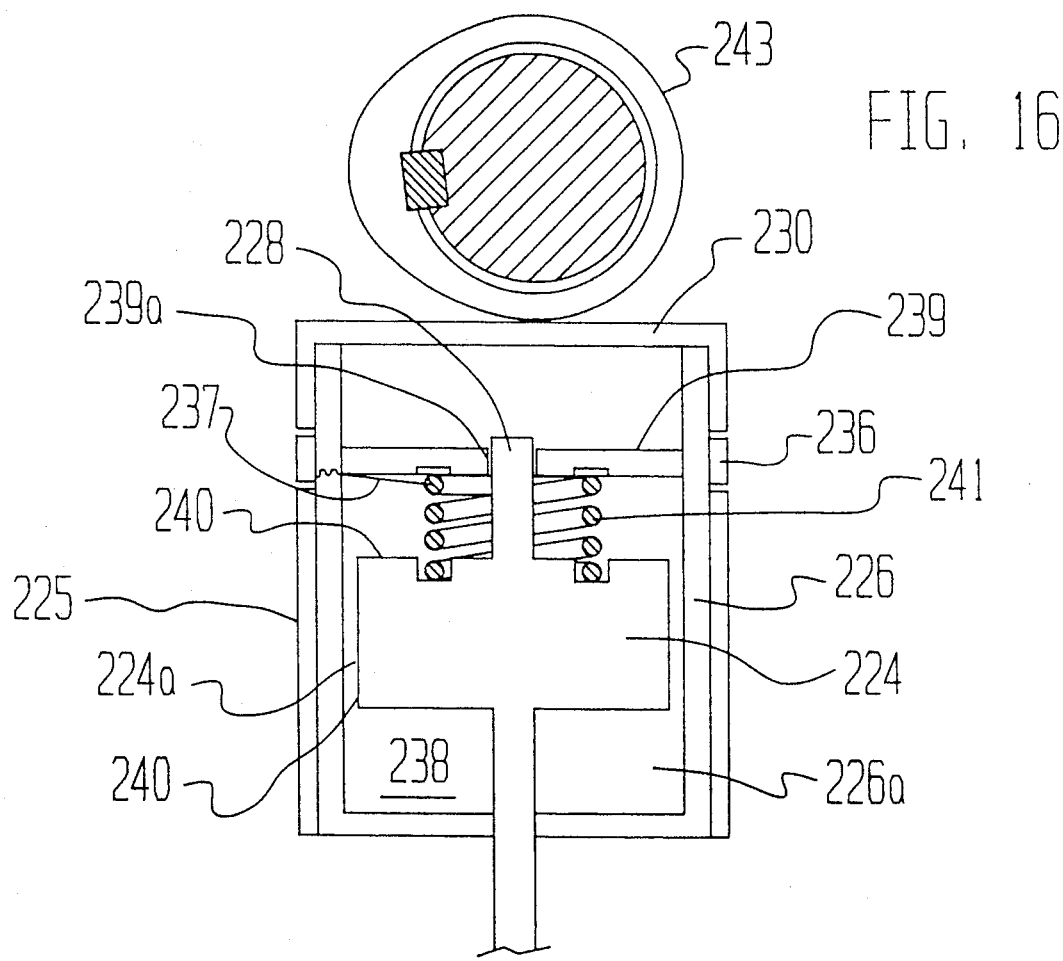

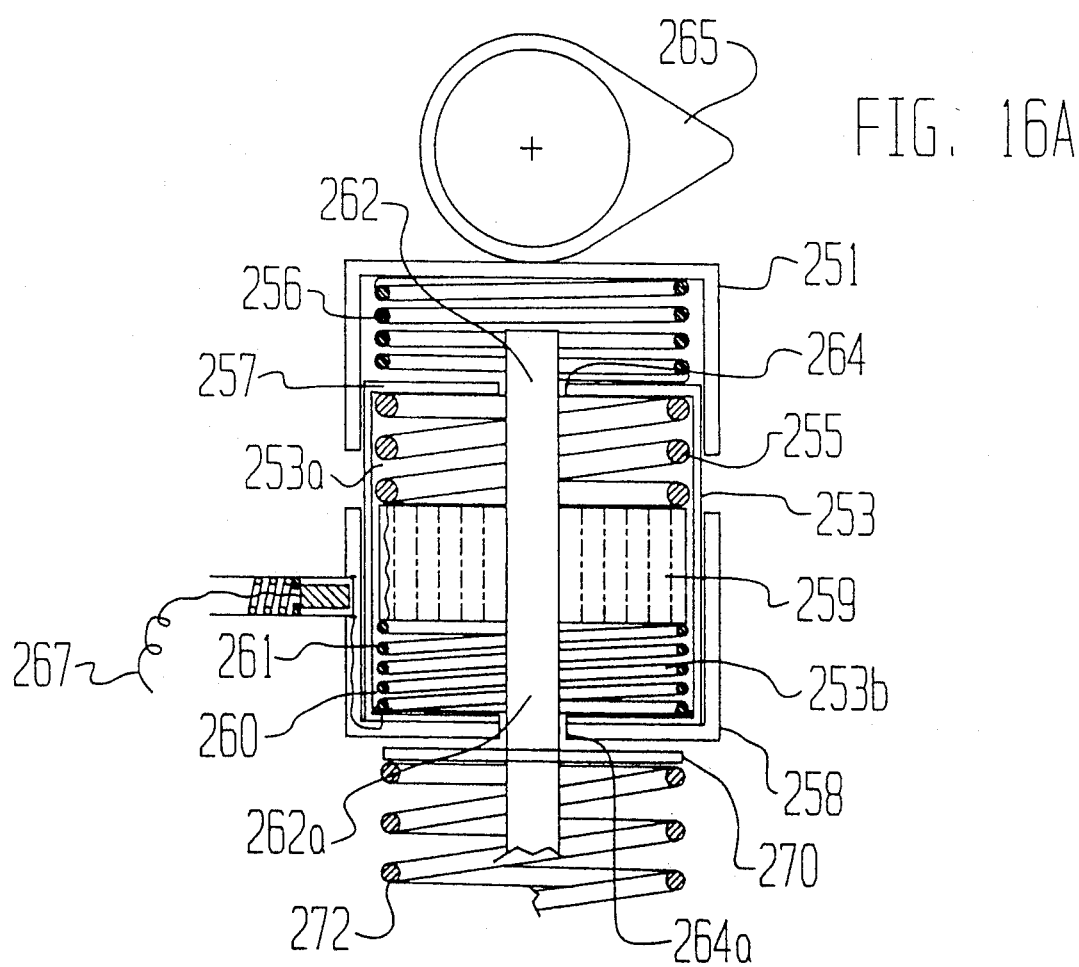

ELECTRO-RHEOLOGICAL VALVE CONTROL MECHANISM

RELATED APPLICATIONS AND CLAIM OF PRIORITY

This application is a continuation-in-part of U.S. Ser. No. 533,733 filed June 5, 1990, abandoned, which is itself a continuation-in-part of U.S. Ser. No. 399,178, filed Aug. 29, 1989 now U.S. Pat. No. 4,930,463, which is further a continuation-in-part of U.S. Ser. No. 339,748, filed Apr. 18, 1989, now abandoned.

BACKGROUND OF THE INVENTION

1. Field of the Invention

The present invention is directed to devices incorporating electroviscous and electro-rheological fluids for use in gasoline and diesel powered engines. Specifically, the present invention is directed to novel valve control and electrode mechanisms and configurations for electrifying electro-rheological fluids for use in valve timing, lift, control and compression braking and other functions in diesel and gasoline automotive engines.

2. Description of the Prior Art

It has been well understood for many years that the performance of piston operated internal combustion engines can be substantially improved by varying the valve lift and/or timing in accordance with engine speed and power. While there is no simple mechanical means for adjusting valve cam profiles, it has been recognized that valve lift variation can be achieved, by varying the level and timing of the valve lifter. The importance of varying valve timing, lift, dwell and overlap to meet different operating conditions has long been recognized. Cams profiled for smooth engine operation at low and moderate speeds do not provide efficiency at high speeds. Conversely, cams profiled for high speeds, power and acceleration do not perform efficiently at low speeds, and tend to run rough, provide poor fuel economy, and create greater air pollution. Numerous mechanisms have been developed to provide variable valve timing and lift in diesel and gasoline engines. Typical prior art devices have employed mechanical, hydraulic or solenoid activated mechanisms.

A first type of device operates by effectuating small changes in the over-all length of the lifter. A second type employs a two position system, i.e. a low position (minimum unit extension), and a high position (maximum unit extension). A third type of prior art valve lift device continuously alters valve lifter position, while a fourth type operates by completely deactivating the associated valve. In the Cadillac Modular Displacement System, for example, selected valves are deactivated/activated by shifting rocker arm pivot points by an electric solenoid to remove a selected cylinder completely from operation. Numerous patents for "split engine" operation such as Springer U.S. Pat. No. 4,284,042, Brown U.S. Pat. No. 3,964,455, Mueller U.S. Pat. No. 4,151,817 provide means for disabling the valves of selected cylinders. Patents providing selective operation of multi-lobe cams include Wagner U.S. Pat. No. 3,277,874 and Hausknecht U.S. Pat. No. 4,134,371. Additional hydraulic valve deactivation mechanisms are disclosed in U.S. Pat. Nos. 4,442,806 and 4,515,121.

Several prior art devices have been directed to electronically programmed and controlled engine valves including U.S. Pat. No. 4,009,695 to Ule and U.S. Pat. No. 3,682,152 to Muller-Berner. Also significant is U.S. Pat. No. 3,786,792 to Pelizzoni. These patents, among others, recite many of the benefits which can be achieved from controlled variable valve action.

Each of these conventional methods of controlling valve lift, timing and deactivation is complex and expensive. Each requires hydraulic or solenoid actuated control systems which are often difficult to position, control, replace and repair. It would be desireable to have a simple valve controller wholly integral to the valve lift mechanism which could control valve lift and timing.

It has been recognized for several decades that certain fluids respond to the influence of an electric potential by evidencing a rapid and pronounced increase in viscosity and an increased resistance to shear. Such electro-rheological or electroviscous fluids comprise slurries of finely divided hydrophilic solids in hydrophobic liquids. In the absence of an electric field, these fluids behave in a Newtonian fashion, but when an electric field is applied, the fluids become proportionately more viscous as the potential of the electric field increases. In strong electric fields, these fluids can thicken into a solid. The electro-rheological phenomenon reverses when the electric potential is removed, and the material returns to its fluid state. Electro-rheological fluids change their characteristics very rapidly when electric fields are applied or released, with typical response times being on the order of one millisecond. The ability of electro-rheological fluids to respond rapidly to electrical signals makes them well suited as elements in mechanical devices. Patents directed to compositions of electro-rheological fluids include U.S. Pat. Nos. 3,367,872; 3,047,507 and 4,033,892. Electro-rheological fluids have been extensively used in clutches as disclosed, for example, by U.S. Pat. Nos. 4,444,298 and 4,493,615, and more recently in shock absorbers and hydraulic applications.

Until recently, the practical application of electro-rheological fluids was limited to low temperature environments due to the previously required presence of water in the electro-rheological fluid. In a high temperature environment, the water in the fluid would vaporize and lead to corrosion. This strictly limited the use of electro-rheological fluids away from high temperature applications on or near gasoline and diesel powered automobile and truck engines and the like. Recently, the temperature problem has been minimized with advances in electro-rheological fluid technology such as those disclosed in U.S. Pat. Nos. 4,744,914 and 4,772,407. Electro-rheological devices, because of their special nature offer numerous advantages over mechanical valve control devices incorporating hydraulic, solenoid and cam operated action, such as that utilized in standard valve lifters.

Compression braking has also long been an important feature in heavy trucks, vehicles which operate in mountainous terrain, and racing vehicles. Compression braking is based upon the principle of utilizing engine compression as an energy pump to retard the speed of the pistons and drive shaft. Patents disclosing compression released engine retarders include Price U.S. Pat. No. 4,485,780, Cartledge U.S. Pat. No. 3,809,033, and Samuel U.S. Pat. No. 4,393,832. All disclose systems which halt fuel injection during the braking operation and open the exhaust valve to release compression when the piston is close to top of dead center (T.D.C.) position during the compression stroke in a four cycle engine. Each of these devices incorporate the use of complex and expensive hydraulic or solenoid structures (in addition to the standard valve lifters) for lifting the exhaust valve to induce compression braking. The embodiments of the electro-rheological valve control device disclosed herein can, in addition to controlling valve lift and timing, also be applied to create a safer, more reliable and less expensive compression braking mechanism.

In view of the above, it would be desirable to provide a novel valve lift and control mechanism incorporating electro-rheological fluids which can be used in a variety of gasoline and diesel engine applications which are currently performed by complex and expensive solenoid hydraulic and mechanical devices.

It would further be particularly desirable to provide a novel electro-rheological device which can function as a valve controller, lifter and timer and which can replace hydraulic, solenoid and mechanically actuated valve lifters such as those disclosed in U.S. Pat. Nos. 3,865,088 and 4,203,397.

It would further be desirable to provide an electro-rheological device having a novel electrode configuration situated within the device itself which facilitates compactness, control, and facilitates compatibility with the on-board computers and microprocessors found in modern automobiles and trucks.

It would further be desirable to provide a valve lift, timing and control mechanism which can simultaneously function as a compression braking mechanism for diesel engines.

It would further be desirable to provide a replaceable wear strip to alleviate tappet and cam spalling and to provide more convenient maintenance shims.

A principal object of this invention then is to provide an electro-rheological device for varying valve timing, control and lift in response to varying operating conditions such as changes in speed, acceleration, power demand, and temperature, so as to maximize overall efficiency, acceleration, speed and power, and so as to provide smoother operation at all speeds, reduced pollution and increased fuel economy.

Another object of the present invention is to provide a variable valve control unit which can be designed for partial lift in a preset number of positions (i.e. a high lift position or a low lift position), or alternatively to provide infinitely variable control between the high lift and low lift position.

A further object of the invention is to provide an electro-rheological device which permits the rapid deactivation of a selected valve to allow that valve to remain closed while the remainder of the valve gear operates normally.

Another object of the present invention is to provide a simple means for rendering selected valves operative or inoperative on demand, i.e., complete activation or deactivation.

A further object of the invention is to provide a method or system for improving the performance of multi-valve engines by timing one set of valves (i.e. one intake valve and one exhaust valve) being for normal operation with the other valve or set of valves (i.e. another intake valve or another pair of intake and exhaust valves) timed for maximum performance, acceleration and high speed and power, the first set of valves remaining in operation at all times and the second set of valves being activated and operating on demand for speed and acceleration.

Another object of the invention is to provide an electro-rheological valve control means which also serves to provide engine compression braking by use of the usual exhaust cam to open the exhaust valve at a predetermined time near the end of the piston exhaust stroke or at a time determined by the on-board computer microprocessor, and as a consequence, to absorb energy during compression and to dissipate it by releasing it into the exhaust system to provide a braking action.

A further object of the invention is to provide an electro-rheological valve lift mechanism which is self-contained and can easily be removed and replaced as a single unit.

A further object of the present invention is to provide an electro-rheological valve control mechanism which can be utilized in conjunction with conventional hydraulic valve lifters.

A still further object of the present invention is to provide an electro-rheological control apparatus which can be utilized on the cam and cam shaft.

SUMMARY OF THE INVENTION

In accordance with the present invention, an electro-rheological valve is disclosed. The invention comprises a generally cylindrical container for holding an electro-rheological fluid; a slidable tappet attached at one end of the cylindrical casing, said tappet being in communication with cam means for thrusting said tappet into said casing; a perforated flow-through piston member coupled to said tappet to permit the flow of electro-rheological fluid therethrough; a lift member situated within said casing and separated from said perforated member by a biasing spring and said electro-rheological fluid, the lift member being connected to a valve to be lifted; electrode means coupled to said perforated member for generating an electric field within said member such that said electro-rheological fluid within said member solidifies whereby a compressive fluid force is applied to the lift member which lifts the valve; and, alternatively the electrode valve means may be contained outside of the cylindrical container in a by-pass conduit.

BRIEF DESCRIPTION OF THE FIGURES

The foregoing summary, as well as the following detailed description will be better understood when read in conjunction with the drawings appended hereto. For the purpose of illustrating the invention, there is shown in the drawings an embodiment which is presently preferred, it being understood, however, that this invention is not limited to the precise arrangement and instrumentalities as shown.

FIGS. 16 and 16A are section views of additional embodiments of the valve controller of the present invention.

DETAILED DESCRIPTION OF THE PREFERRED EMBODIMENT

Figure 1:
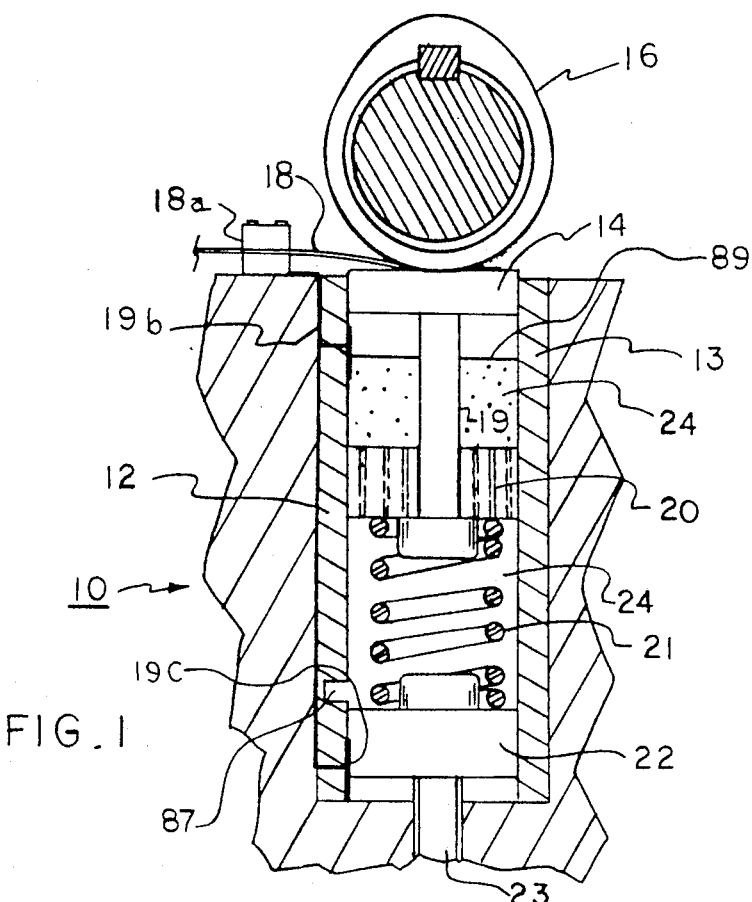
FIG. 1 is a section view of the valve controller of the preferred embodiment.

The present invention is described with reference to the enclosed Figures wherein the same numbers are used where applicable. Referring to FIG. 1, the valve control mechanism 10 of the present invention is illustrated. The mechanism 10 can be utilized to lift an exhaust or intake valve in an internal combustion gasoline or diesel powered engine. In addition, it can be utilized to control other engine valving. As shown, the mechanism comprises a unit 10 which is retained within a seat 12. The valve controller comprises a substantially cylindrical housing 13 with a reciprocating tappet 14 which slides within the housing 13 and which is retained in contact with a cam 16. The cam 16 is typically attached to the cam shaft of a four stroke internal combustion engine utilized in automobiles, diesel trucks and the like.

Figure 2:
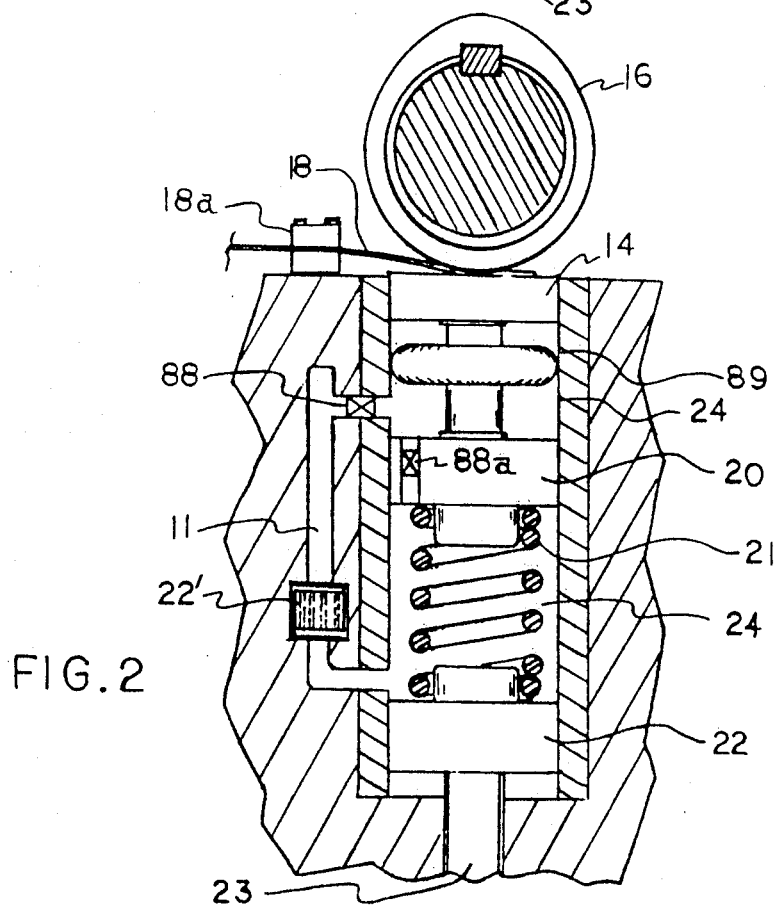
FIG. 2 is a section view of the valve controller of the second embodiment.
Figure 1A:
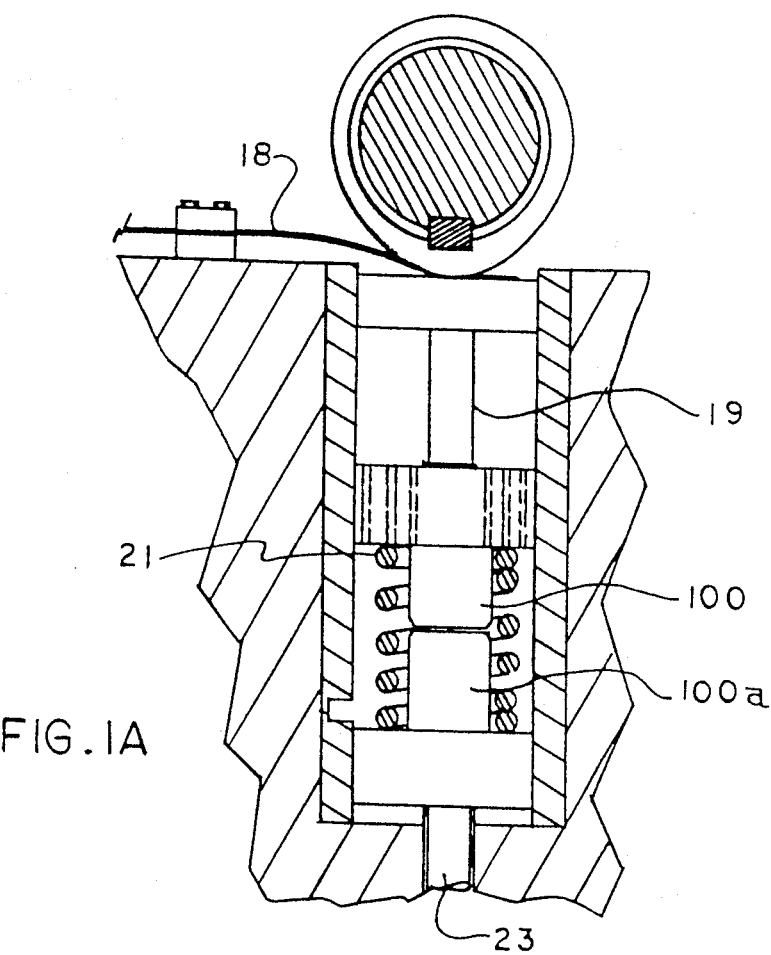
FIG. 1A is section view of the valve controller of the present invention utilized as a compression braking mechanism and also illustrating the wear strip.

As shown in FIGS. 1, 1A, and 2, a wear strip 18 is included to protect the tappet 14 and minimize friction. The wear strip 18 is composed of a thin flexible material and may contain internal electrode wires which, as will be described herein, can be utilized to electrify the electro-rheological fluid contained within the housing. The wear strip 18 is firmly attached to the lifter support by a two piece block 18a. In addition to housing the electrodes, the strip takes most of the wear resulting from the sliding contact of the rotating cam. The reciprocating tappet 14 is connected by a rod 19 to a perforated or flow-through piston member 20 which extends longitudinally into the housing 13. Rod 19 contains the electric wire or wires which, as will be described herein, are utilized to electrify the electro-rheological fluid contained within the housing. A second reciprocating valve lifter member 22 retained within the housing 13 is separated from the tappet 14 and perforated piston member 20 by a biasing spring 21 and the electro-rheological fluid 24 contained within the housing. Valve lift member 22 pushes against a valve train 23. Biasing spring 21 biases the tappet 14 against the cam 16.

Housing 13 is filled with electro-rheological fluid 24. Electro-rheological fluids comprise slurries of finely divided hydrophilic solids in hydrophobic liquids. In the absence of an electric field, these fluids behave in Newtonian fashion, but when an electric field is applied, the fluids become more viscous as the potential of the electric field increases. The phenomenon reverses when the electric potential is removed, and the material returns to its fluid state. In strong electric fields, the fluid may thicken into a solid.

There are numerous electro-rheological fluids which have been developed. Preferably, the present invention should be utilized with electro-rheological fluids which are designed to operate in high temperature environments such as those disclosed in U.S. Pat. Nos. 4,744,914 and 4,772,407, and which are incorporated herein by reference. As will be described in greater detail herein, the reciprocating perforated piston member 20 functions as an electrode which solidifies the electro-rheological fluid 24. The housing 13 contains a level detector 19b which determines the changing levels of electro-rheological fluid 24 within the housing 13. In operation, the signal generated by the level detector 19b is processed by the on-board computer. In addition, the unit will contain a position sensor 19c which will sense the instantaneous position of valve lifter 22 provide signals to an on-board computer.

The electrode configurations of the present invention are now described with reference to FIGS. 4A-4D, 5, 6 and 7. While the present invention utilizes one of four possible electrode configurations, in each of the embodiments, a perforated or flow-through member contains a sequence of electrodes which when activated by an electronic impulse, generate a plurality of electric fields which solidify the electro-rheological fluid within the perforations, and prevent the fluid from flowing through the solidified member. The solidified member serves as a piston which compresses the remaining electro-rheological fluid contained in the housing against the valve lift member thereby opening the valve.

Figure 4D:
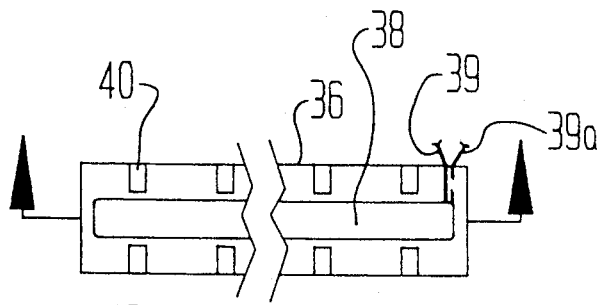
FIG. 4D is a section view of the spiral electrode configuration utilized in the preferred embodiment.
Figure 4C:
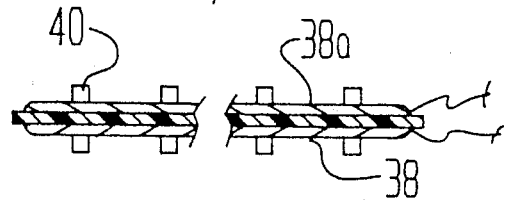
FIG. 4C is a planar view of the spiral electrode along line A—A of FIG. 4A.
Figure 4A:
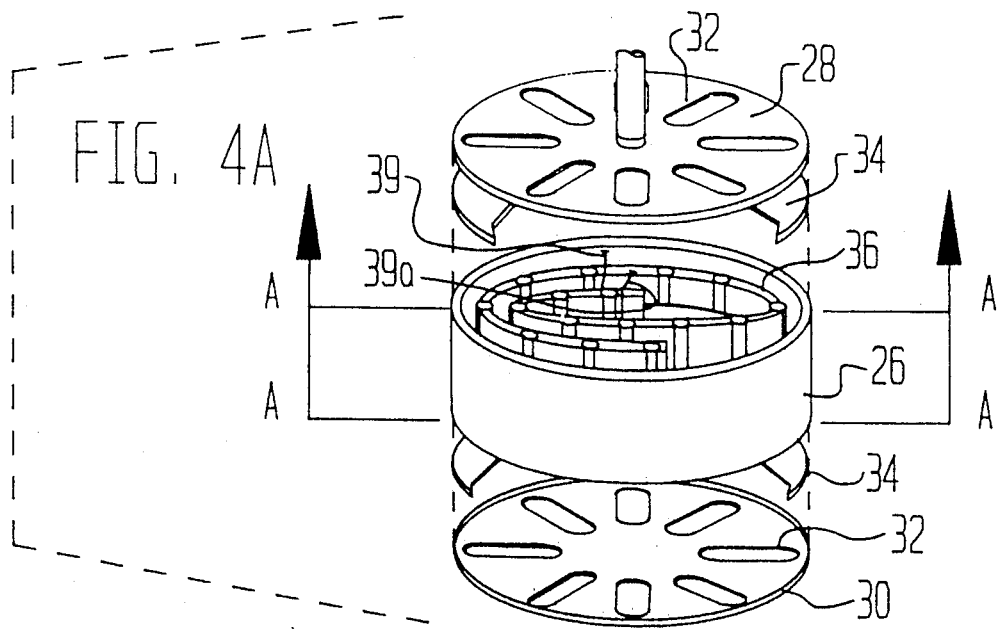
FIG. 4A illustrates an exploded view of the spiral ring electrode configuration utilized in the valve controller of the preferred embodiment.
Figure 4B:
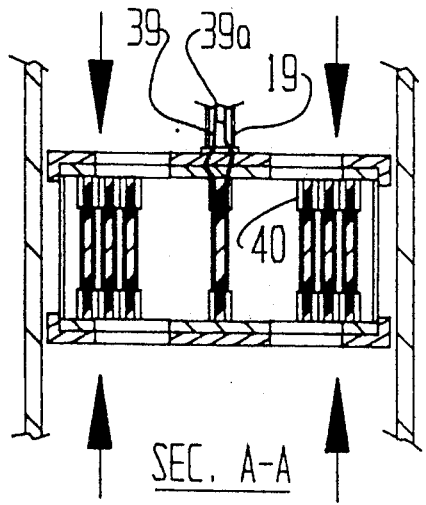
FIG. 4B is a section view of the spiral ring electrode configuration utilized in the preferred embodiment.

As shown in FIG. 4A-4D, the first flow through member comprises a hollow cylindrical housing 26 having respective top and bottom plates 28, 30, each having a plurality of elongated radial apertures 32. The top and bottom plates 28, 30 each compress respective perforated insulative layers 34. The perforations of the insulative layers align with apertures 32 on the top and bottom plates. The housing 26 contains a spiral thermally resistant polymer, mylar or plastic band or coil 36 which is coated with a metallic electrode 38, 38a on each of its sides. The metallic coatings 38, 38a can consist of copper, aluminum, silver, nickel or any other electrically conductive material. The band turns are separated by plastic ribs 40 which both create channels for fluid flow as well as maintain the electrical integrity of the coil. At the center of the spiral, one metallic band 38 is connected to a positive terminal 39 with the other being connected to a negative terminal 39a. The electric wiring may extend through hollow rod 19 (FIG. 4B) and is connected through wear strip 18 to the on-board computer or microprocessor. As shown in FIG. 4B, the spiral coil thus effectively forms a wound alternating sequence of positive and negative terminals. When the electrodes 38, 38a are activated, fluid flowing through the apertures is solidified by the electric field formed between the walls of the spiral coil. The reciprocating flow through piston member 20 thus becomes a solid plunger which applies a downward thrust against the remaining electro-rheological fluid 24 in the housing 13 and the valve lift member 22. The valve lift member 22 pushes against the valve train 23 and lifts the valve.

Figure 5:
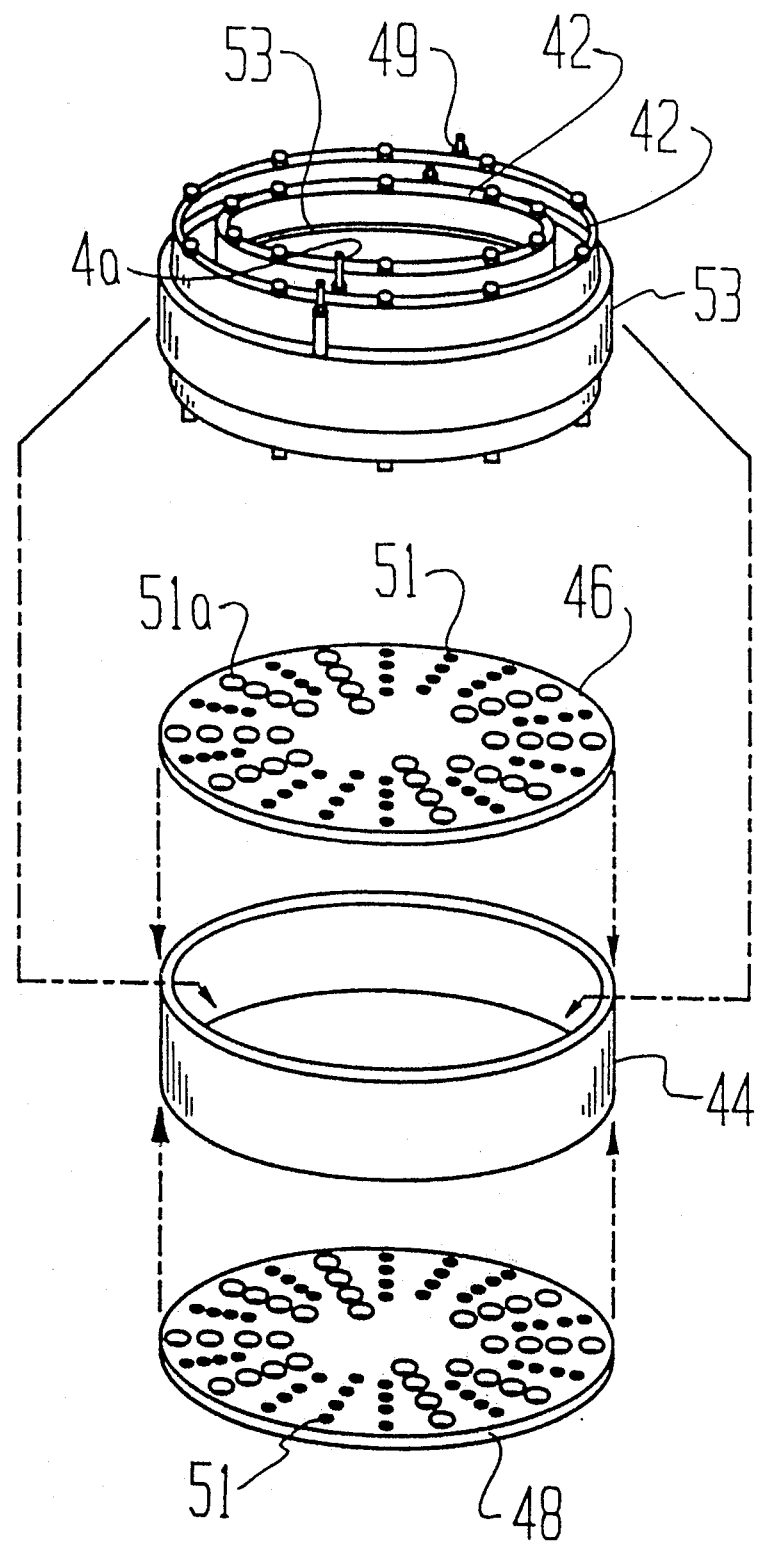
FIG. 5 is a configuration showing concentric rings or cylinders for electrodes utilized in the valve controller of the preferred embodiment.

Referring to FIG. 5, the flow through piston member comprises a sequence of concentric flat rings, cylinders or bands 42. As with the first electrode configuration of FIGS. 4A-4D, the flat concentric rings, cylinders or bands 42, which may be constructed from ceramics or temperature resistant polymer, fit within a cylindrical housing 44 and contain respective top and bottom perforated plate members 46, 48. The plates have holes 51a for electro-rheological fluid flow. Each ring is coated on opposite sides with a flat ring or band electrode 53 which is then connected to either a positive and negative terminal 49 to holes 51 and through to rod 19. It will be appreciated that the concentric rings may be constructed of metal, in which case alternating rings will be charged with opposite polarity. In operation, electro-rheological fluid flows between the concentric electrode rings and into the upper portion of the housing. When the plunger member 20 is electrified, a plurality of electric fields are created between the electrodes on the concentric bands, thereby solidifying the electro-rheological fluid situated therebetween. As with the embodiment of FIGS. 4A-4D, upon the activation of an electrical impulse, the perforated plunger transforms into a solid piston.

Figure 6:
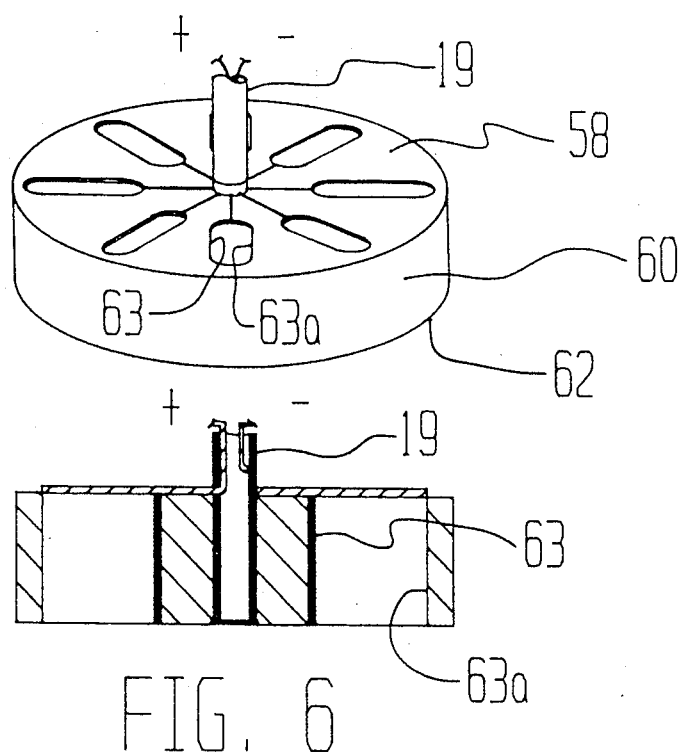
FIG. 6 illustrates a perforated or flow-through piston electrode configuration to be utilized in the valve controller of the preferred embodiment.
Figure 7:
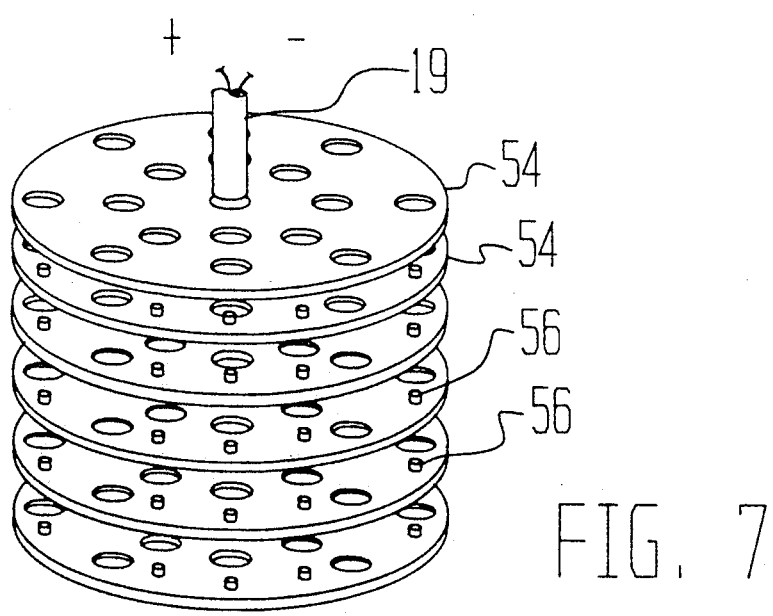
FIG. 7 illustrates an exploded view of the wafer electrode configuration to be utilized in the valve controller of the preferred embodiment.
Figure 7A:
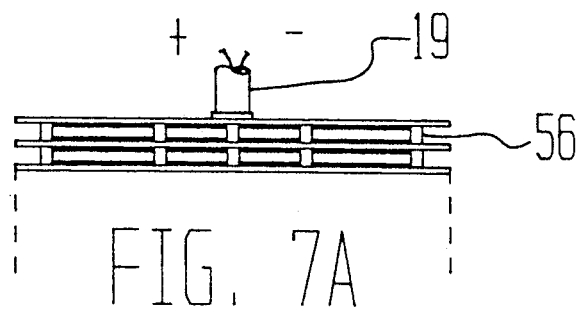
FIG. 7A is a section view of the wafer electrode configuration of the preferred embodiment.

Referring to FIGS. 7 and 7A, the perforated member 20 contains a multiple sequence of perforated metallic disk-shaped wafers 54 through which the electro-rheological fluid flows. The wafers form flow through screens, are configured alternatingly in a positive to negative relationship, and are retained in a non-contacting position by posts 56 or by separator ring washers. In this embodiment, the housing may itself serve as the negative terminal, with alternating wafers being maintained in electrical contact with the housing. The positive wafers are electrically insulated from the negative piston head and are in contact with a positive terminal which is insulated from the housing and which extends through the rod 19 to wear strip 18. In operation, it may be desireable to offset the wafers in order to improve solidification and the pressure characteristics of the plunger. During operation, fluid flows through the parallel disposed disk shaped wafers. When the electrodes are activated, a multiplicity of electric fields are generated between the respective positive and negative terminals formed by the wafers. The electro-rheological fluid within the piston head solidifies and the piston member forms a solid plunger. The solidified plunger compresses the remaining electro-rheological fluid and pushes upon the valve train thereby lifting the valve. It is to be appreciated by those skilled in the art that the screens may be disaligned in order to facilitate complete solidification A final embodiment of the electrode is illustrated in FIG. 6. As with the previous embodiments, the piston head comprises a cylindrical casing having perforated top and bottom members 58, 62. The casing contains a molded temperature resistant plastic or ceramic disk 60. Disk 60 contains numerous radially extending apertures through which electro-rheological fluid can flow and which are mated with the top and bottom members. The opposite sides of each radial aperture 63, 63a are parallel and equidistant and are coated or plated with copper or other conductive metal and function as respective positive and negative electrodes. The width of each aperture should be between 0.5 and 1.5 millimeters. Electro-rheological fluid flows through the apertures until electrified. When the electrodes are activated, the electro-rheological fluid contained within each aperture solidifies, and the flow through member forms a solid plunger.

The four electrode configurations of the present invention have been described with reference to an electrode configuration extending through the wear strip. It will be immediately apparent to those skilled in the art that other methods exist for electrifying the electrodes. These include, for example, the use of copper slip rings or bands on the tappet contacted by brushes on the outer casing and the use of induction coils located within the tappet and plunger. It is to be appreciated by those skilled in the art that a ring or band electrode may be provided along the inside of the casing and surrounding any sliding member such as piston 20, or member 14 or 22, so that when electrified the fluid will thicken at this interface so as to prevent blow-by between the sliding surfaces. In such a case, the ring will serve as one electrode with the casing itself serving as the other electrode. The electric activation of the ring electrode will solidify the electro-rheological fluid between sliding surfaces and the casing and thereby prevent or impede fluid blow-by.

Figure 8:
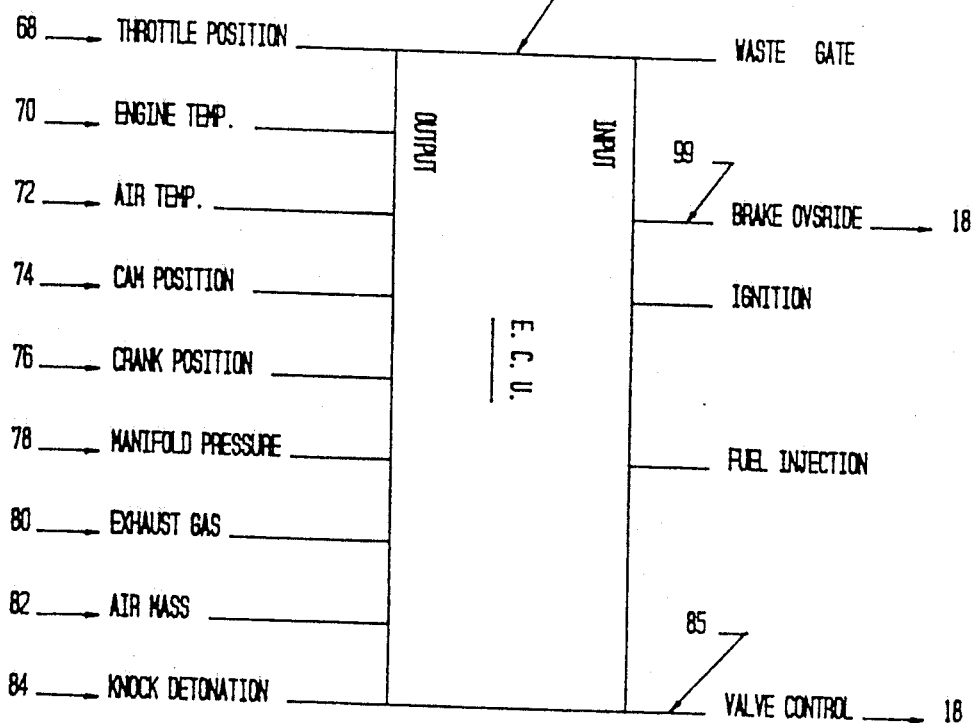
FIG. 8 is a block representation of the computer control system for the preferred embodiment.

The control unit 66 for the preferred embodiment is now described with reference to FIG. 8. The control unit comprises a conventional microprocessor or computer which provides timing signals to control the electrification of the electro-rheological fluid contained within the valve controller chamber. The valve controller is adjusted by varying the timing of the activation of the signals. The electronic computer received continuous operating data from the engine. The computer or microprocessor receives feedback from such parameters as the throttle position 68, engine temperature 70, air temperature 72, cam position 74, crank position 76, manifold pressure 78, exhaust 80, air mass 82 and knock detonation 84, and signals from level detector 19b or position sensor 19c. Timing signals are accordingly provided to the electrodes by wires contained within the wear strip 18 via valve control 85, or by the other alternative means for electrifying the electrodes.

The operation of the embodiment is now disclosed with reference to all the enclosed Figures. The present invention is designed to be utilized in an internal combustion engine in association with a cam shaft. As the cam profile changes with the rotation of the cam shaft, the cam face pushes down on tappet 14. The tappet 14 forces down the connected perforated piston member 20 having one of the face configurations shown in FIGS. 4A-4D, 5, 6 and 7. During the periods when the electrodes are not activated, electro-rheological fluid flows through the face of the perforated member 20 as it is thrust into the housing 13. When the perforated member having one of the electrode configurations herein described is activated by the computer or microprocessor control system, the electrodes contained within the face of the piston 20 activate. The perforated member instantaneously (within one millisecond) solidifies the electro-rheological fluid 24 and effectively transforms the member into a solid plunger which prevents further flow of fluid through the perforations. The continued downward thrust caused by the cam pushes against the remaining electro-rheological fluid in housing 13 and the fluid pressure against the valve lifter 22 opens the valve. By adjusting the timing and duration of the electrode activation, the timing and duration of valve lift can be precisely controlled. Timing is controlled by the processor which outputs signals in response to a series of operating parameters.

An alternative embodiment of the invention is illustrated in FIG. 2. The alternative configuration comprises the valve lifter of the preferred embodiment. Instead of the perforated plunger of FIGS. 4A–4D, 5, 6 and 7, the alternative embodiment invention incorporates a solid plunger 86 with by-pass conduit 11. The by-pass conduit 11 contains a perforated member 22, which incorporates one of the electrode configurations shown in FIGS. 4A–4D, 5, 6 and 7. In the alternative embodiment, when the tappet 14 is pushed downward into the cylindrical chamber, described above, a solid plunger 86 exerts a downward force against the electro-rheological fluid contained in the housing 13. The electro-rheological fluid enters the by-pass channel 11 and flows through the electrodes 22' Upon the application of an electrical impulse to the perforated member, the fluid within the member solidifies. The electrification of the perforated member blocks off the flow of electro-rheological fluid 24 through the by-pass channel 11. The downward thrust of the tappet 14 and plunger 86 against the remaining electro-rheological fluid contained within the chamber, pushes against the valve lift member 22 and lifts the valve. This embodiment further incorporates a one way valve 88 in the by pass passage which facilitates the rapid outflow of electro-rheological fluid from the by-pass channel 11 to the main chamber on the upstroke of the lifter. In addition, a one way valve 88a may also be located in the plunger head in order to enable fluid to return to the upper chamber on the upstroke.

It should be appreciated that the use of a bypass channel 11 with a one way valve 88 and/or a one way valve 88a in the plunger head in order to facilitate the return of fluid to the upper chamber on the upstroke is not limited to this embodiment. It should be recognized that the clearance between electrodes is relatively small; therefore, even when not electrified, there is some resistance to fluid flow between them. In most adaptations of the present invention, there will be a relatively strong force moving fluid out of the compression chamber but a weaker force returning the fluid. Use of a one way valve, either in the electrode unit or located in a bypass passage, will augment the fluid refill cycle and facilitate refilling the upper chamber.

Figure 10:
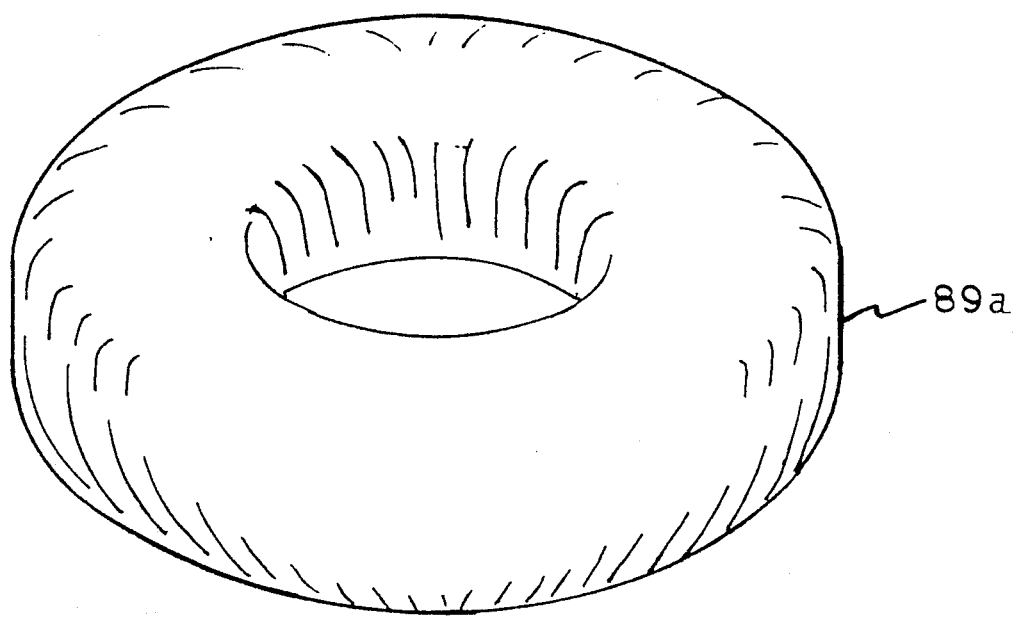
FIG. 10 is a section view of a nitrogen filled neoprene balloon utilized in the present invention.
Figure 10A:
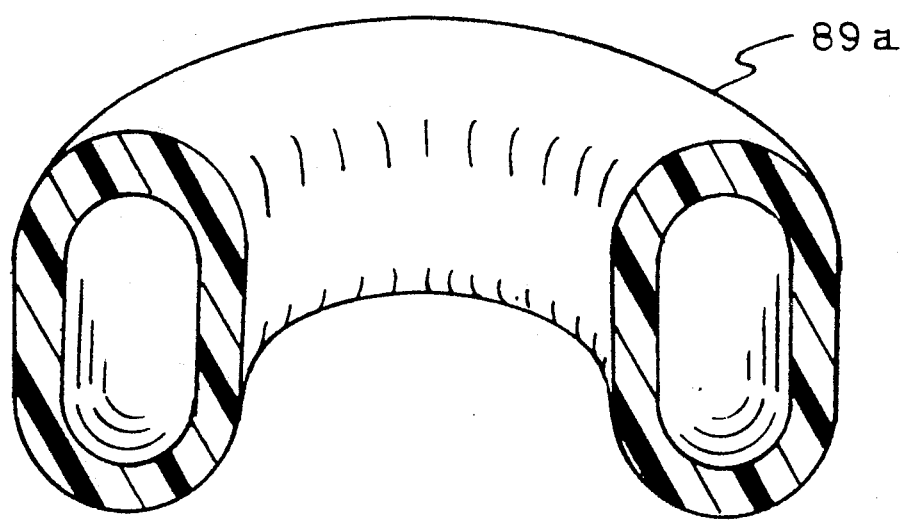
FIG. 10A is a perspective view of the nitrogen filled neoprene balloon utilized in the present invention.

It will be understood and appreciated by those skilled in the art that provision should be made for the thermal expansion and the volumetric change caused by the movement of the piston rod 19 into the electro-rheological fluid chamber. The present invention incorporates a small chamber 87 in contact with the housing 13. It is to be noted that normally the expansion reservoir would always be connected with the low pressure chamber, and not the high pressure chamber, so as to avoid sponginess in the valve operation and control. In addition, a floating diaphragm 89 is also provided to account for the volumetric changes resulting from the depression of the tappet during the downstroke. It will be appreciated by those skilled in the art that additional mechanisms can be utilized to compensate for thermal and volumetric expansion of the electro-rheological fluids including the provision of a bubble of nitrogen gas in the compression chamber, or a nitrogen bubble in expansion chamber 87. Referring to FIG. 10, a nitrogen filled neoprene balloon 89a may also be utilized to compensate for the thermal expansion of the electro-rheological fluid. The neoprene balloon 89a is shown in FIG. 2 and FIGS. 10 and 10a.

Figure 3A:
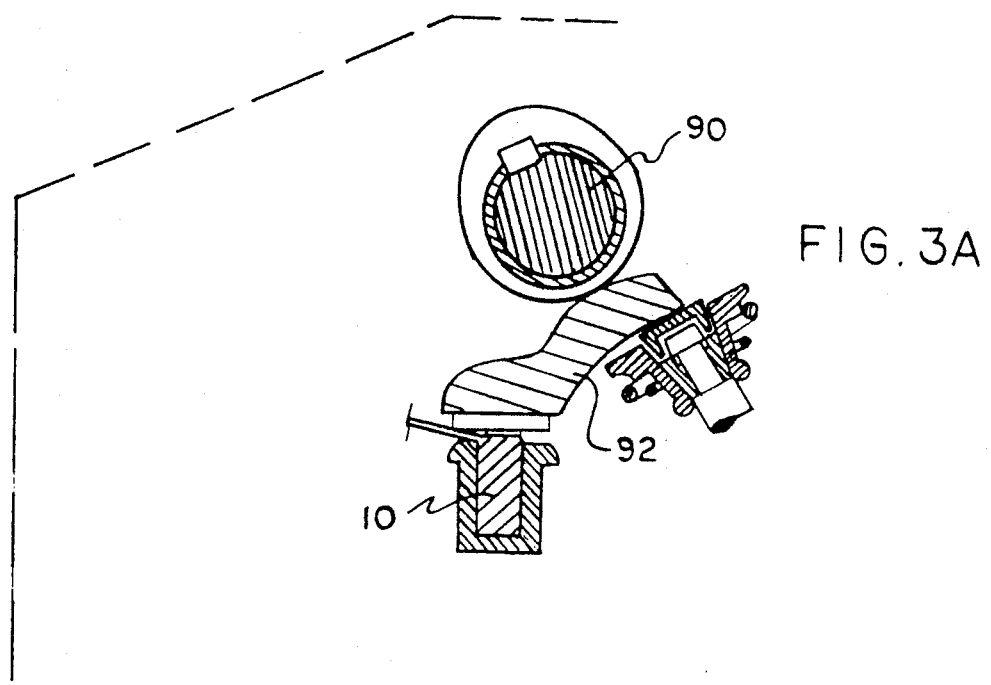
FIGS. 3A-3C illustrate the valve controller of the present invention in different cam and position configurations.
Figure 3B:
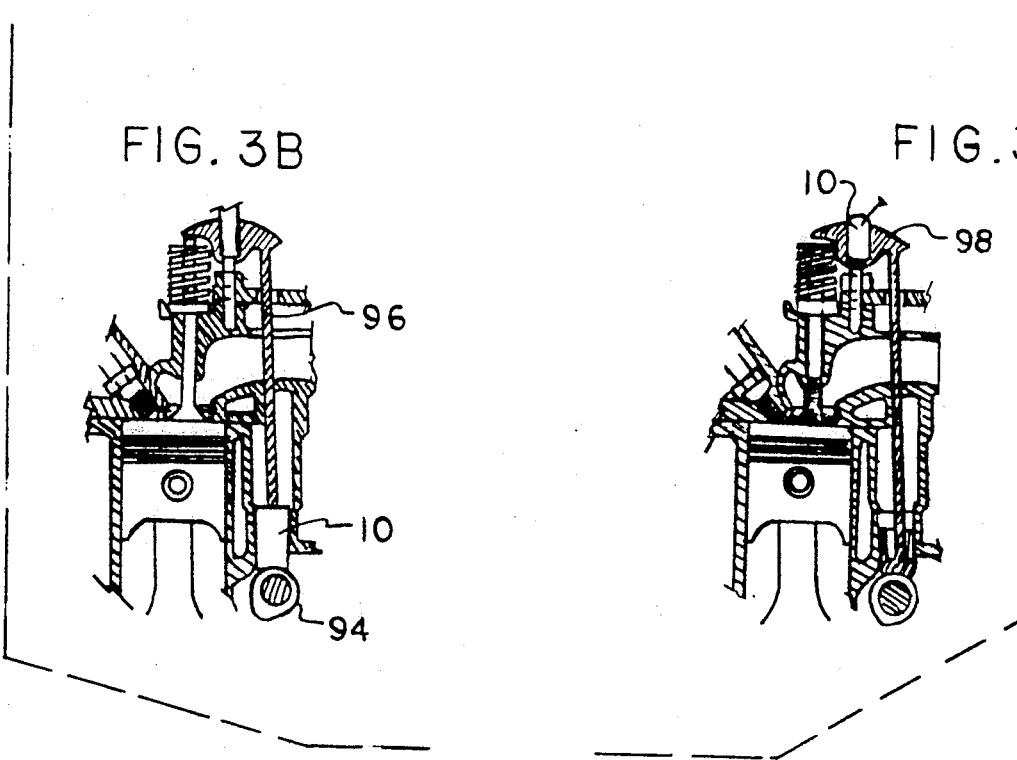
Figure 3C:
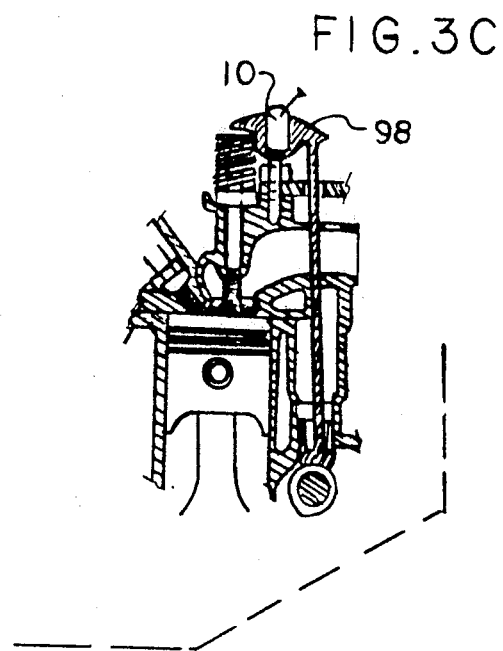

Referring to FIGS. 3A–3C, three positional configurations for the valve controller of the preferred and alternative embodiments are shown. FIG. 3A illustrates the use of the present invention 10 in an overhead camshaft 90 with rocker arm configuration 92. FIG. 3B illustrates the use of the present invention 10 in an engine with low camshaft 94 and push rod 96. FIG. 3C illustrates the valve controller of present invention 10 positioned over the rocker arm pivot point 98. The present invention can be replaced as a unit.

A final aspect of the electro-rheological valve lift, timing and control system of the present invention is its application for use as a compression braking mechanism. As noted above in the Background of the Invention section, compression braking has been extensively utilized in heavy four cycle diesel truck engines. In all prior art systems, compression braking is performed by opening the exhaust valve at a predetermined point near the completion of the compression cycle. In compression braking, the fuel supply is turned off and the engine functions as an air pump which operates to retard the pistons and drive shaft. All previous attempts at compression braking have required separate hydraulic or solenoid devices to open the exhaust valve(s) at an appropriate juncture when the compression brake is applied. The present invention can be modified to provide normal valve lift operation and compression braking.

As shown in FIG. 1A, the bottom of the piston member and the top of the valve lift member may include respective contact members 100, 100a. While the contact members secure the biasing spring, their length represents a preset distance near the point of complete extension. During normal operation, fuel is injected into the engine and valve lift timing is controlled by the microprocessor in accordance with the dynamic parameters of the engine. When the brakes are applied, however, fuel injection to the engine is immediately terminated and the normal opening of the exhaust valve is delayed. Concurrently, the intake valve(s) (also controlled by the disclosed valve controller) are also deactivated. In operation, the low signal port from 99 the microprocessor overrides and deactivates the electro-rheological fluid. The tappet 14 and plunger 20 move down into the chamber until the respective contact members 100, 100a meet. This point corresponds to a point near the completion of the exhaust stroke and will provide an amount of lift (approximately 0.04 to 0.045 inches). Compressed air exits through the exhaust valve thereby representing a loss of energy in the system. Alternatively, the microprocessor may signal the valve controller when to open the intake/exhaust valve, instead of employing the contact means. Accordingly, the present invention can be can be utilized as a component in an overall computer or microprocessor based system to provide both valve lift, deactivation, and compression braking. If desired, a fail-safe provision can be incorporated in the valve lifter as indicated in FIG. 1A. If the electro-viscous fluid means should fail for any reason, such as loss of fluid or electrical failure, contacts 100 and 100a will lift the valve at least partially and enable partial operation of the engine during the emergency.

It will be understood by those skilled in the art, that the disclosed electro-rheological valve controller means may be housed in a cylindrical body as a replaceable unit, and can have the general configuration of a conventional hydraulic valve lifter, and be located as usual in the reciprocating valve train, and itself reciprocating with the valve/cam tappet; and having its internal plunger capable of extension and retraction so as to change the over-all length of the unit, on command from the microprocessor. In this application, the internal plunger will not be required to make a separate relative movement with each tappet reciprocation; that is, its movement relative to its corresponding members will be required or needed only for a change in valve lift, therefore, there is no fluid movement in the unit during the same valve lift setting, with less wear and fluid heating; no rapid internal reciprocation will be thus required. In this application, lash occurring during partial lift or full deactivation can be eliminated, or be absorbed, by a relatively weak coil spring urging the valve train elements apart; and thus clatter, wear, etc. is eliminated or minimized.

Figure 9:
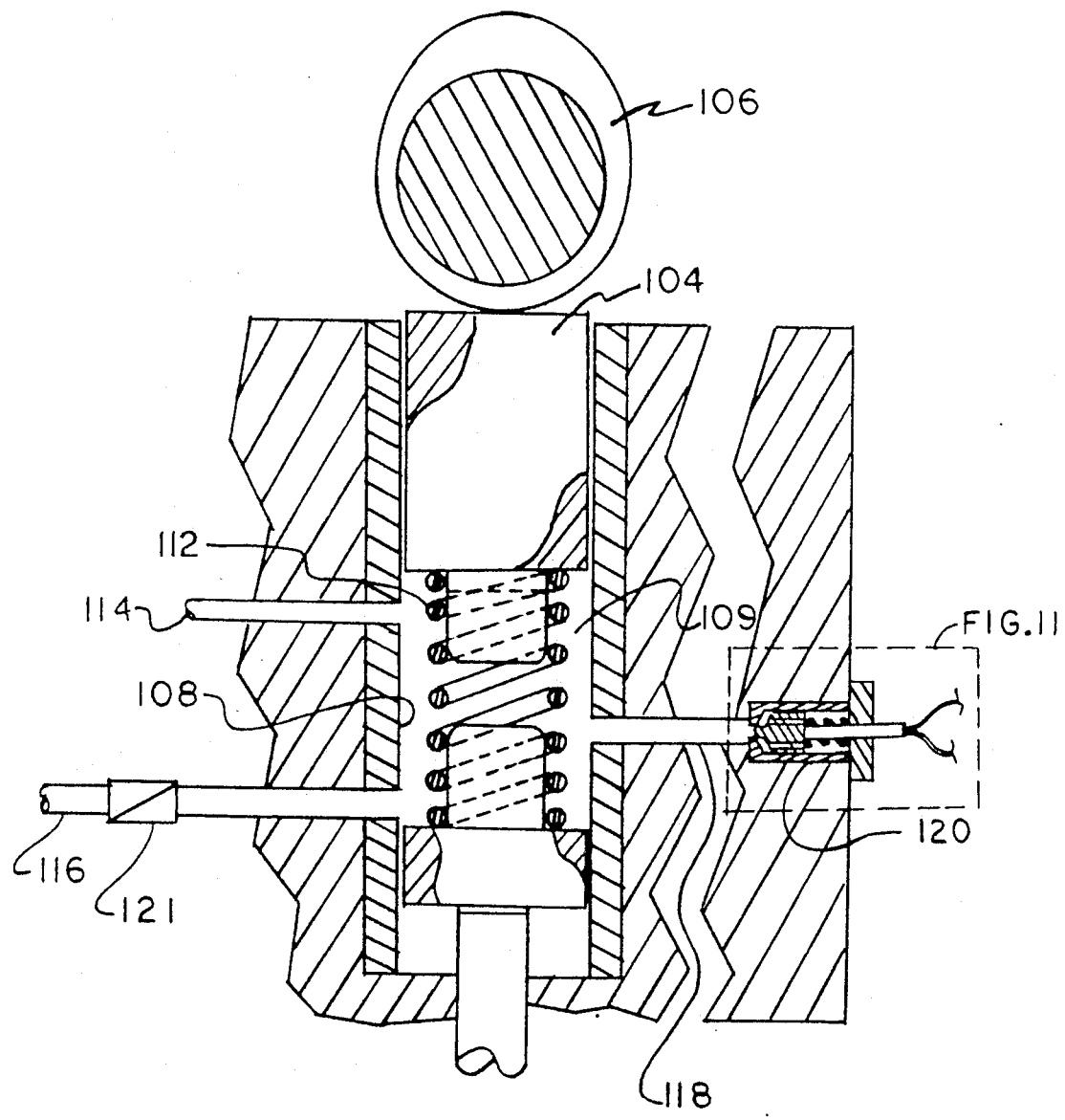
FIG. 9 is a section view of a valve control mechanism of the present invention which incorporates hydraulic fluid and an electro-rheological control valve.

While the present invention has been described in context of a valve controller in which an electro-rheological fluid is contained within the main chamber or, alternatively, forced into a by-pass channel, it is to be recognized that the present invention can be utilized in coordination with a standard hydraulic valve lifter in which an electro-rheological control valve having an electrode configuration in accordance with the present invention, is utilized. Referring to FIG. 9, the valve controller comprises a conventional tappet 104 which is thrust downward by a rotating face cam 106. The tappet 104 extends into a valve chamber 108 which is filled with a hydraulic fluid or oil 109. The valve lifter 110 is separated from the tappet 104 by the hydraulic fluid or oil 109. A biasing spring 112, situated within the hydraulic fluid 109, separates the tappet 104 and valve lifter 110, and maintains the tappet 104 in contact with the cam 106. The central chamber holding the hydraulic fluid or oil 109 contains ports 114, 116, 118. Fluid enters port 116 protected by a one-way valve 121 and leaves through port 114 until tappet 104 covers port 114, and continues downward and compresses the fluid in the chamber. Alternatively, the fluid may exit through outlet 118, which is controlled by an electro-rheological control valve 120. The hydraulic fluid or oil can circulate through the chamber and return to the central storage during the period when port 114 is uncovered. This will purge the chamber of any air or foaming, and will also provide cooling for the unit. If refilling the chamber is a problem, alternatively, the hydraulic fluid or oil can also enter through port 114.

Figure 11:
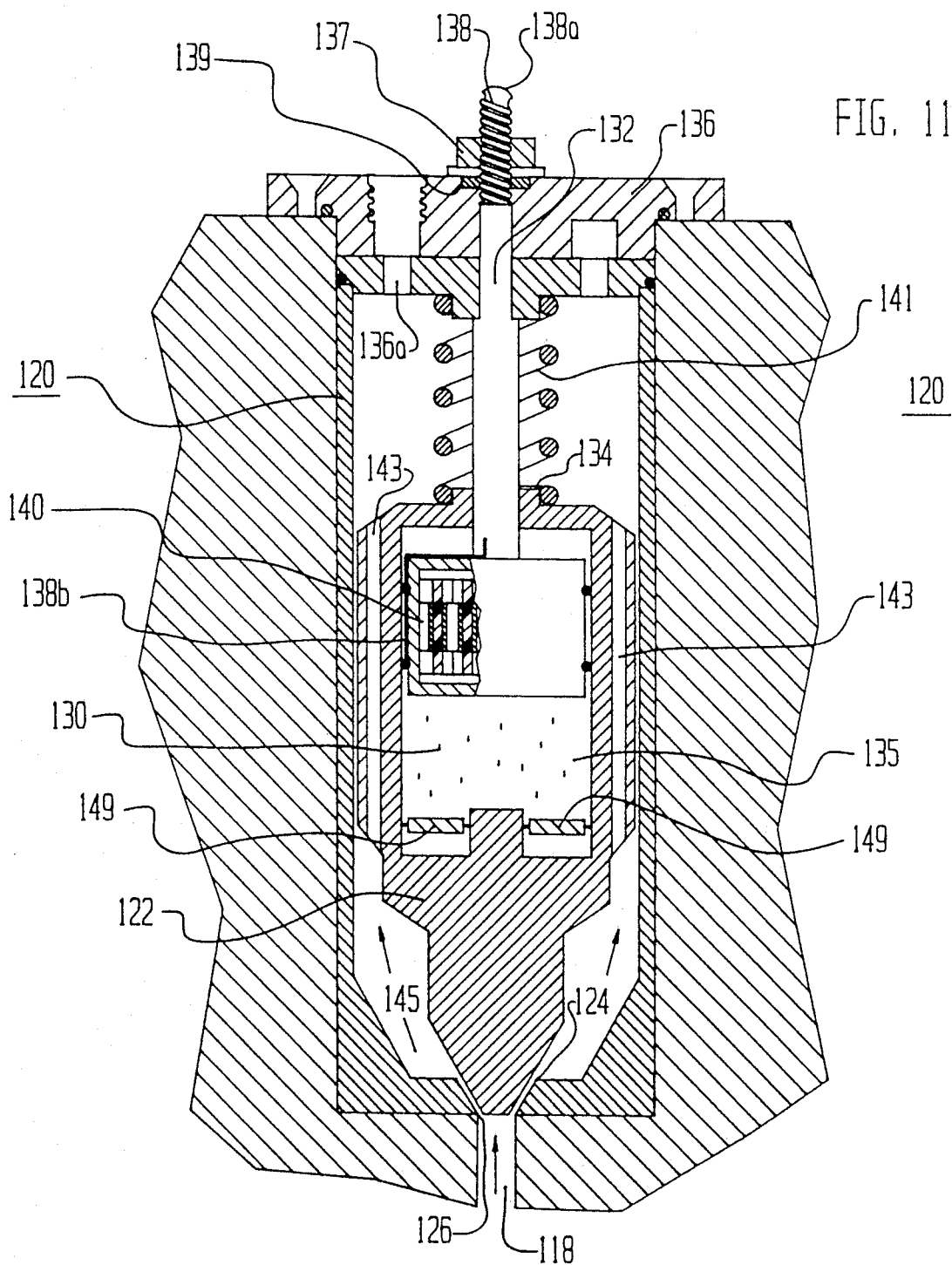
FIG. 11 is a section view of an electro-rheological control valve to be utilized in the embodiment of FIG. 9.

As shown in FIG. 11, the valve 120 comprises a floating head 122 with a land 124 which slidably mates with a valve seat 126 located on the conduit extending from outlet 118. The floating head 122 oscillates in a longitudinal direction with respect to an arm member 132. The center of the head is hollow and contains electro-rheological fluid 130. The arm 132 extends into the center of the valve, through a central bore 134 and into the cavity 135. The arm 132 is retained by a retaining end plate 136 and gland 137 and gasket 139. The end plate 136 has a hole 136a for permitting flow out of the valve. The arm has electrode wires 138, 138a which extend through the center of the hollow cavity 135. Attached to the arm is a perforated electrode member 140 (partially broken away) which has one of the four embodiments set out in FIGS. 4A-7. A position sensor 138b is coupled to the perforated electrode which provides instantaneous signals corresponding to the position of the floating head 122. In operation, the valve oscillates with respect to the perforated electrode 140 contained within the cavity. A biasing spring 141 forces the valve toward a closed position. An annular conduit 143 bored into the casing permits hydraulic fluid or oil to flow between the valve seat and outlet 136a.

In operation, as the cam rotates, the tappet 104 is pushed downward thereby creating a hydraulic pressure on the fluid contained within the valve chamber. The fluid accordingly attempts to exit through outlets 114, 116, and 118. A fluid pressure will accordingly be created on the face of the electro-rheological valve blocking conduit 118. The valve member will tend to be thrust inwardly and unseat, thereby enabling flow of hydraulic fluid or oil flow through channel 145 and into the annular conduit 143. By applying and varying an electrical signal to the perforated electrode 140, the valve member can be locked in place, thereby preventing the outflow of fluid from outlet 118. This will accordingly create a compressive fluid force against the valve lifter and accordingly lift the valve. A ring shaped diaphragm 149 compensates for volumetric changes in the electro-rheological fluid.

Figure 12:
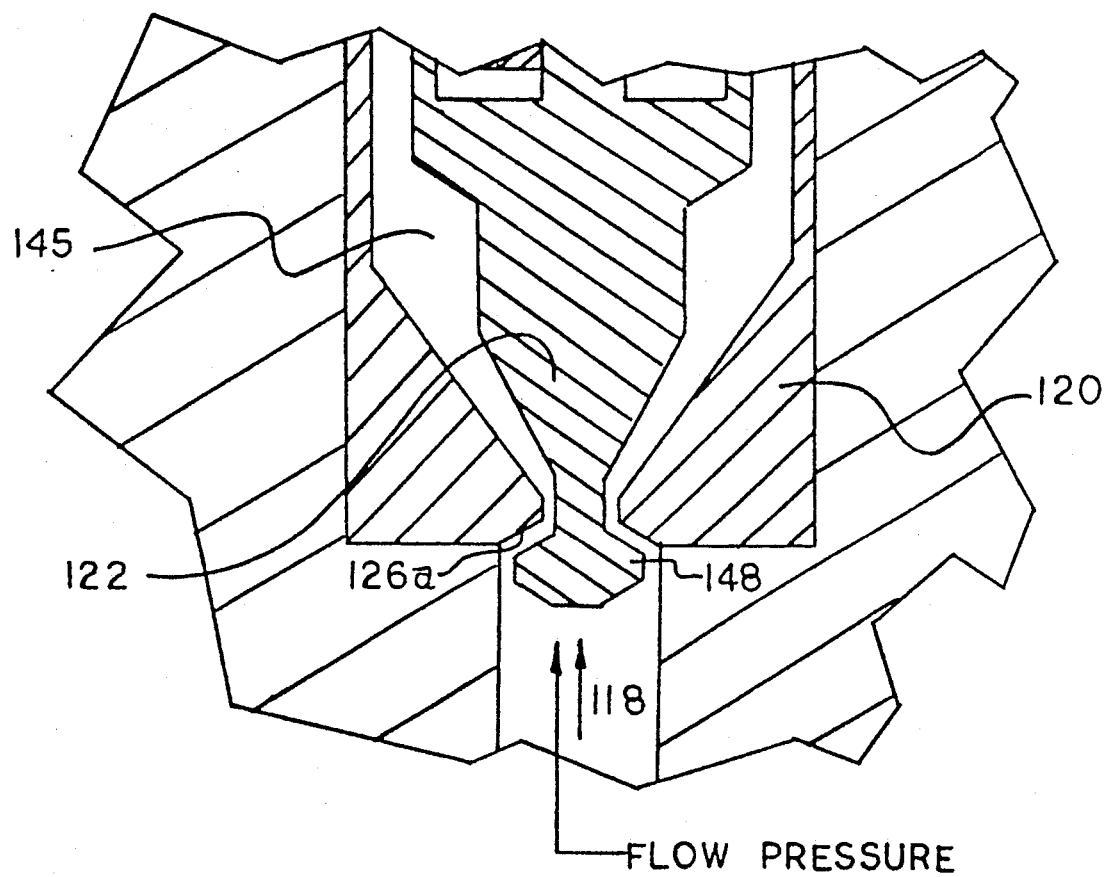
FIG. 12 is a section view of an alternative electro-rheological control valve to be utilized in the embodiment of FIG. 9.

FIG. 12 illustrates an analog to the valve controller shown FIG. 11. The valve is identical to the valve controller of FIG. 12 except the valve is biased open. The valve land 148 extends into conduit 118. Upon the application of a fluid pressure, caused by the downward thrust of the tappet, the valve is forced closed against seat 126a. By applying an electric potential to the perforated electrode, the valve can be locked open until a desired moment of closure.

Figure 15:
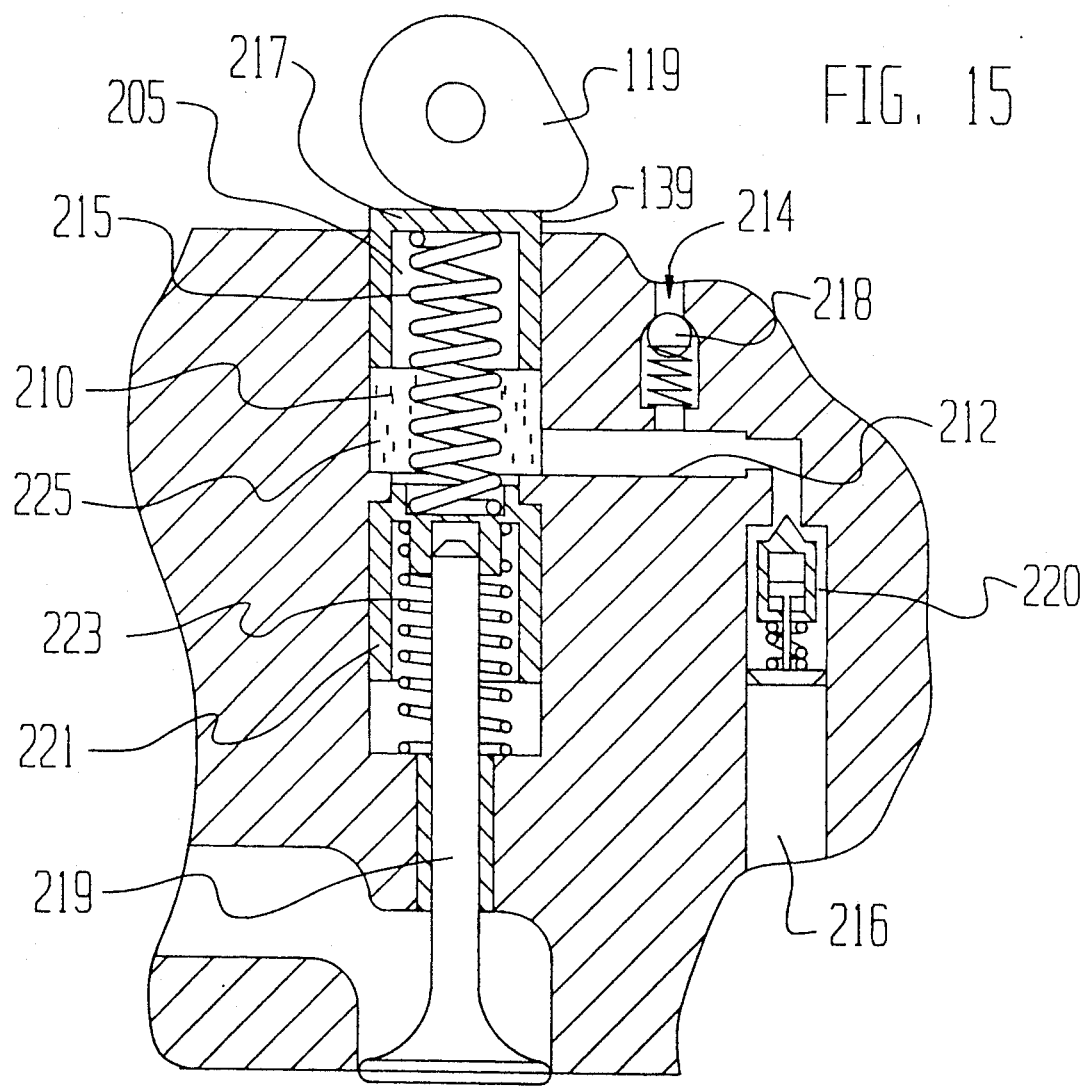
FIG. 15 is a section view of a fourth embodiment of the valve controller of the present invention.

An alternative to the embodiment of FIG. 9 is shown in FIG. 15. This valve includes a face cam 119 which rotates and pushes against a reciprocating tappet 139. The tappet 139 is biased upward against the face cam by a biasing spring 215 which is supported between the casing 217 and the top wall of a lower casing 221. The tappet 139 is hollow and contains hydraulic fluid, electro-rheological fluid or oil 210. The engine valve 219 is retained within a reciprocating lower casing 221 and is biased upward by a second biasing spring 223. A chamber 225 is formed by the inner walls of the tappet 139 and the top wall of the lower casing 221. As the tappet 139 is thrust downward, fluid is thrust out of the hollow tappet chamber 225 and into an auxiliary channel 212. The channel 212 communicates with a fluid-in port 214 and a fluid-out port 216. The fluid-in port 214 has a check valve 218 which prevents backflow of fluid during compression. The fluid-out port 216 is controlled by an electro-rheological valve 220 in accordance with the present invention such as that disclosed in FIGS. 11 and 12.

In operation, as the cam 119 rotates, the tappet 139 is thrust down. Hydraulic fluid, electro-rheological fluid or oil 210 is thrust into the auxiliary channel 212. The check valve 218 prevents the fluid from exiting the fluid-in port valve 218 and the fluid is thrust toward the fluid-out port valve 220. By controlling the electrodes of the fluid-out valve 220, the compressive downward thrust of the tappet 139 and the out flow of fluid is thereby controlled. When the electro-rheological valve 220 is locked closed, fluid cannot exit the outlet 212 due to the combination of check valve 218 and electro-rheological valve 220. A compressive fluid force is created within chamber 225. The force pushes against the top of reciprocating casing 221 and pushes it downward, thus opening valve 219. On the upstroke of the cam 119, the fluid pressure decreases, thereby permitting the valve 219 and casing 221 to return to their initial position. When the electro-rheological valve 220 is deactivated, fluid exits through the valve 220. On the upstroke, additional fluid enters through channel 214. It will be understood that the actuating oil may be circulated through the chamber in order to eliminate problems of foaming or bubbling, or to remove excess heat, as is explained supra with reference to FIG. 9.

In a modification of the embodiment illustrated in FIG. 15, the fluid-in port 214 and check valve 218 are omitted, and electro-rheological fluid 210 is used instead of engine oil. Additionally, a perforated member 22', as shown in FIG. 2 and incorporating the electro-rheological electrodes, is used in place of the electro-rheological valve 220. The electro-rheological fluid moves back and forth through passage 212 from the compression chamber 225 to a reservoir (not shown). The perforated member 22' controls the flow of electro-rheological fluid in and out of chamber 225. Each valve may serve as its own reservoir or, preferably, the passage 212 for each valve may connect with a manifold line (not shown) to one central reservoir (not shown). The reservoir is pressurized to force the electro-rheological fluid back into the compression chamber 225 on the upstroke of the tappet 139. The perforated member 22' may incorporate, if desired, a bypass oneway passage to facilitate fluid return to chamber 225, as illustrated at 88 in FIG. 2 and previously described. The by-pass one-way passage will permit flow of fluid from the reservoir and keep the unit precisely filled. It is understood that this embodiment may incorporate a fluid-out port at the top of compression chamber 225 to facilitate fluid cooling by circulation, etc., as illustrated in FIG. 9. However, in some adaptations, it may be desirable to maintain a fixed quantity of fluid in the compression chamber during reciprocations. If so, the one-way by-pass passage and the out-flow port shown as 114 in FIG. 9 can be omitted. When the fluid control valve 22' alone permits fluid in and out of the unit, there will be occasions when tappet 139 is locked in a depressed position creating a lash between 119 and 139. Clattering may be prevented by dividing the tappet 139 into two parts, connected by a central biasing spring. This false top tappet is explained in greater detail infra with regard to FIG. 16a.

Figure 13:
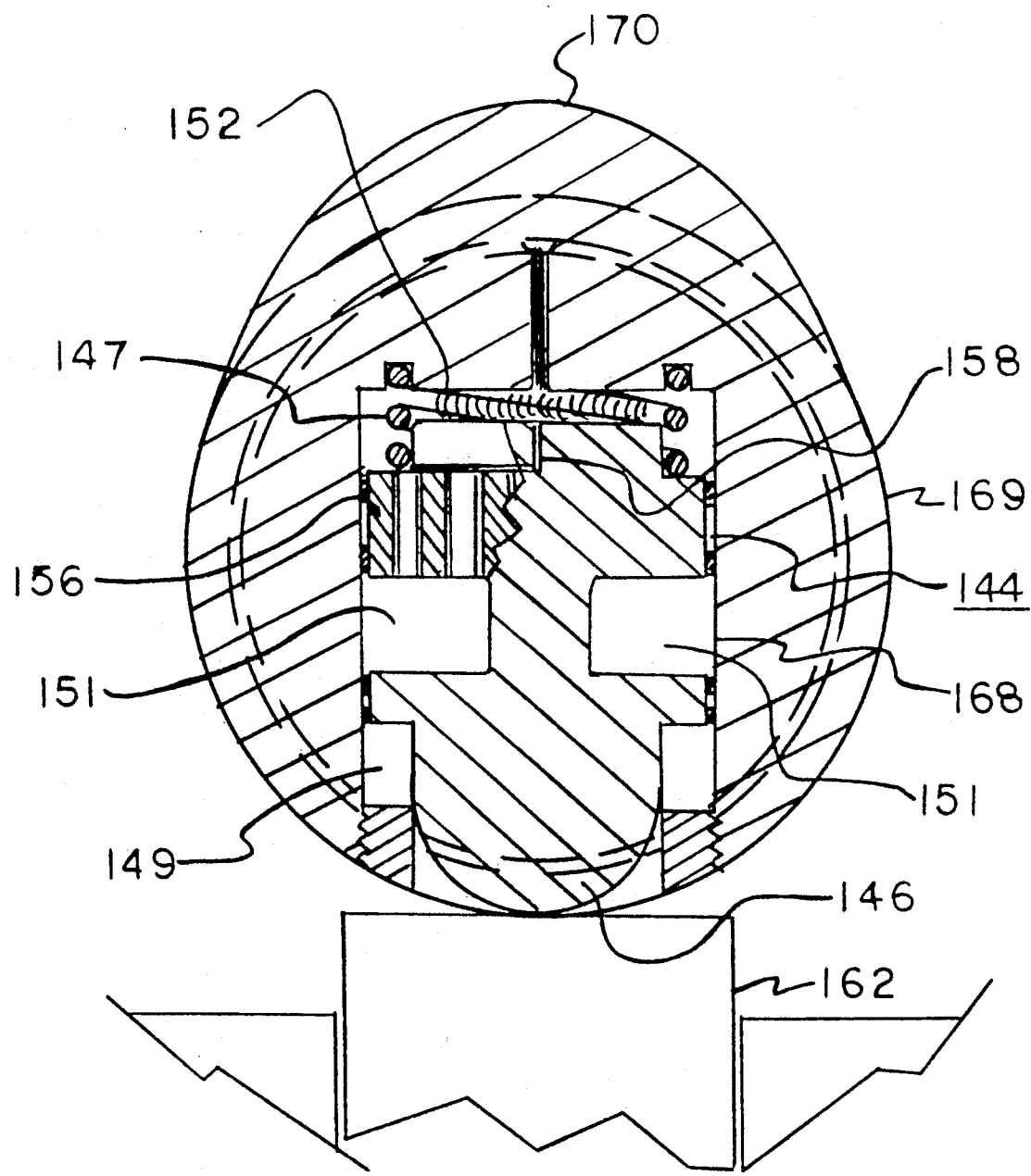
FIG. 13 is a section view of an electro-rheological control valve which is incorporated within the engine valve cam.
Figure 13A:
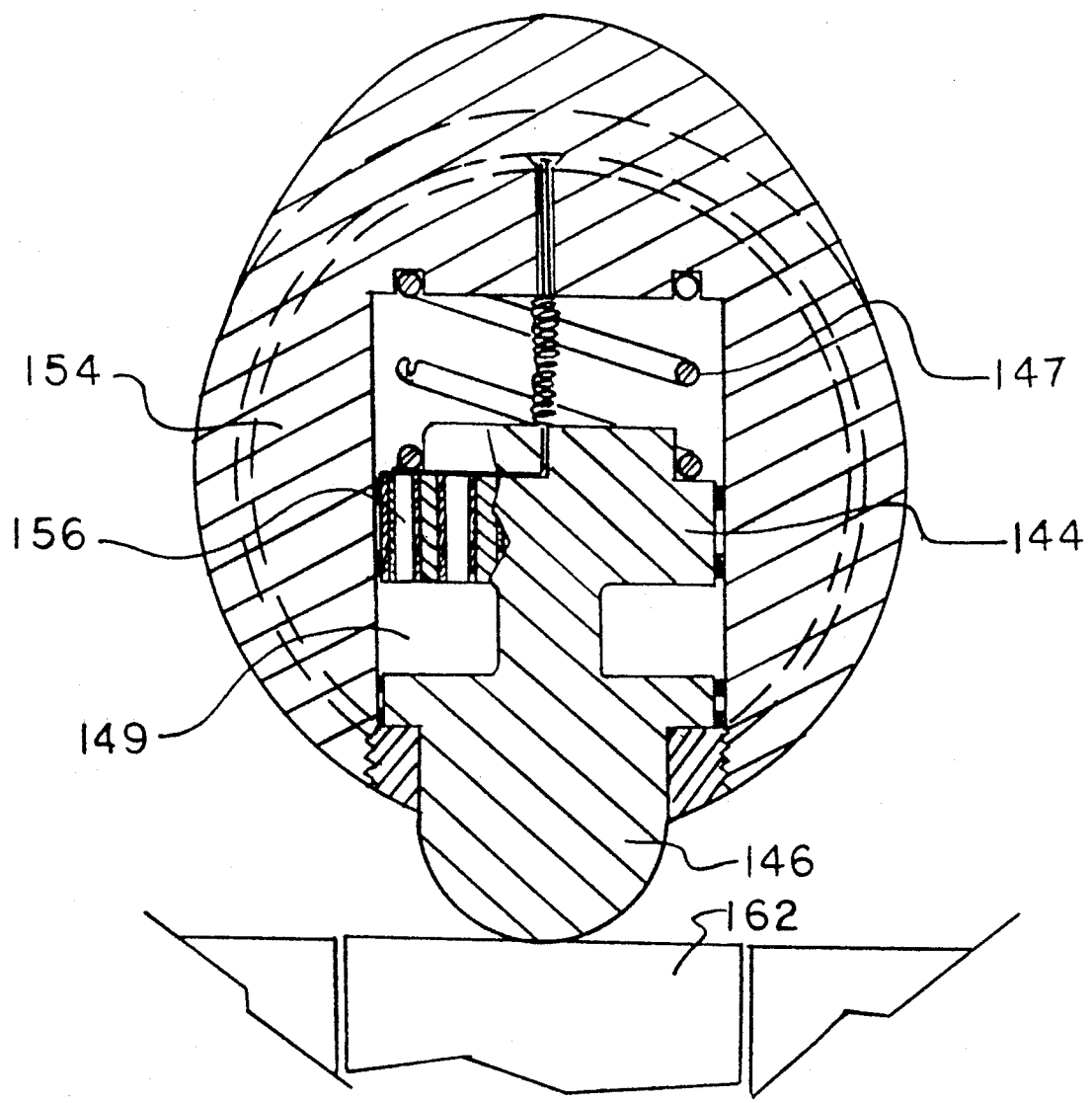
FIG. 13A is a section view of the electro-rheological control valve of FIG. 13 in a retracted position.

In another embodiment of the present invention shown in FIGS. 13 and 13a, the electro-rheological valve controller 144 is utilized within the cam itself. This embodiment is particularly suitable for compression braking. The valve controller 144 is housed within a cylindrical cavity 168 of the cam 169 opposite the main cam lobe 170. A retractable boss 146 housed within the cam controlled by the electro-rheological controller of the present invention, pushes down against the tappet 162. The controller and boss are biased outward by a biasing spring 147. The controller with boss is hollow, and contains a cavity 149 filled with electro-rheological fluid 151. A coil 152 connected to the drive shaft 154 extends into the electro-rheological fluid contained within the cavity.

A perforated electrode member 156 having one of the configurations shown in FIG. 4A-7, extends into the electro-rheological fluid contained within the cavity. The reciprocating boss oscillates relative to the electrode 156. The perforated electrode 156 contains electrode wires 158 which electrify the electrode. The electrode is connected to coil 152 which transmits current emanating from the cam 169. Electric current can be transmitted to the cam from the drive shaft via rings and brushes (not shown). When the perforated electrode is electrified, the electro-rheological fluid 151 contained therein solidifies. A compressive fluid pressure is created within the boss, thereby resulting in the locking of the position of the controller and boss.

The operation of the cam based controller is shown with reference to FIG. 13 and 13A. As the cam with controller and boss rotates, the main lobe serves to periodically depress the valve tappet 162. When no electric potential is applied, the biased controller and boss are compressed into the cam as they ride over the tappet, resulting in no lifting. When an electric potential is applied to the electrode via coil 152, the perforated electrode 156 solidifies, thereby locking position of the controller and boss in place, and further resulting in a compression of the tappet 162 and the lifting of the valve. By controlling the length and timing of the application of potential to the electrode within the cam, the profile and duration of valve lift, opposite the main cam lobe, can be precisely controlled. This embodiment can provide an alternative mechanism for producing compression braking.

An alternative means for accomplishing compression braking utilizes the electro-rheological controller within the tappet itself instead of the cam itself, as shown in FIGS. 13 and 13a. In this alternative adaption, the compression is released during the compression stage, as is presently used in conventional compression braking systems. A double lobe cam is used in cooperation with a double lifter assembly, somewhat similar to the arrangement described in Wagner U.S. Pat. No. 3,277,874. The cam is provided with two sets of cam surfaces of differing contours, comprising a lobe for normal operation and a lobe for lifting the exhaust valve for compression release during the compression stage, when the system is activated.

The double lifter assembly includes an outer lifter and an inner lifter which is slidably contained in the outer lifter and urged outward by a coil spring. The outer lifter is normally supported on the outer cam lobe, and performs the normal valve action. The inner lifter in the form of a plunger is co-axial with and slidably supported within the outer lifter. During normal engine operation the exhaust valve assembly operates as usual, being lifted by the outer lifter actuated by the outer or normal cam lobe. During compression braking, the inner lifter is urged outward from the lifter assembly by a coiled spring and it mates with the inner cam lobe (which is contoured for compression braking). The inner lifter is locked when it reaches its extended position by the electro-rheological controller. When the inner lifter is locked in its extended position, it then follows the inner cam lobe and thus the entire lifter assembly (i.e. the "tappet") moves in cooperation with the inner cam contour. The exhaust valve will then open as desired for compression braking during the latter part of the compression stroke and will function in the manner that the exhaust valves do in conventional compression braking systems.

Figure 14:
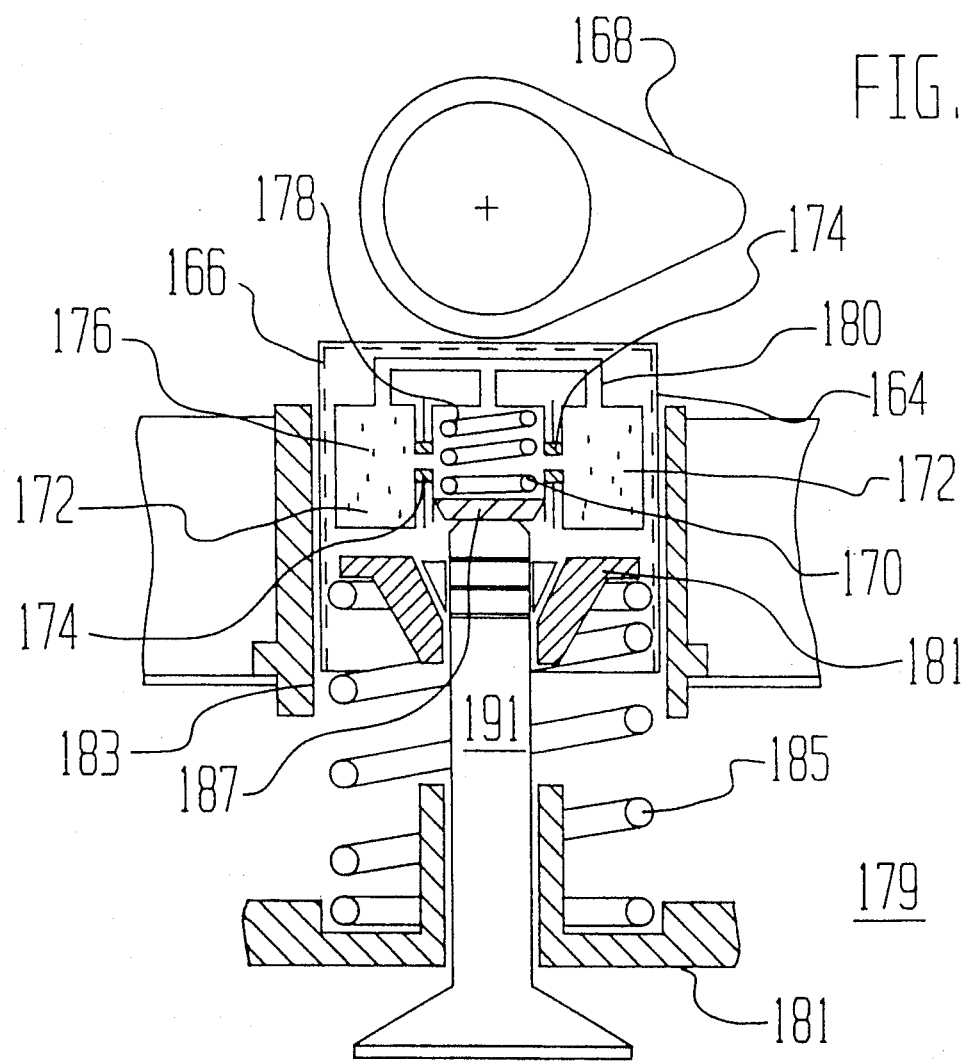
FIG. 14 is a section view of the third embodiment of the valve controller of the present invention.

FIG. 14 is an additional embodiment of the valve controller of the present invention. The valve controller comprises a casing 164 including a reciprocating tappet 166 which is in contact with a face cam 168. The valve controller includes a central chamber 170 which is separated from two side chambers 172 by electrodes 174. The electrodes are separated by about 1.5 mm. Both the central chamber and the side chambers are filled with electro-rheological fluid 176. The side chambers 172 and central chamber 170 are joined by conduits 180 which facilitate the refilling of the central chamber 170 on the upstroke of the cam. The conduit 180 is furnished with a one way valve which locks fluid movement out of the control chamber 170 during the compression stroke, but allows rapid return of the fluid during the upstroke. The chambers also are provided with means for compensating for volumetric changes in the electro-rheological fluid.

The central chamber includes a biasing spring 178 which biases the tappet 166 against the cam. The valve is itself supported by a valve support structure 179 including two rims 181 and guides members 183. A main biasing spring 185 separates the rims. On the other side of the spring 178 is a floating disk 187 which is biased against the valve stem 191.

In operation, as the cam 168 rotates, the tappet 166 is forced downward. The central biasing spring 178 compresses and electro-rheological fluid is forced through the electrodes 174 from the central chamber into the side chambers 172. At an appropriate moment, the electrodes are activated. Flow of electro-rheological fluid out of the central chamber is impeded by the solidification of the electro-rheological fluid through the electrodes 174. The downward thrust of the tappet 166 is impeded and a compressive fluid force is created within the central chamber. This forces the disk 187 against the valve stem 191, thus opening the valve. On the upstroke, the electrodes are deactivated, and the central chamber refills through the electrodes and conduit 180.

FIG. 14, as well as FIG. 9, illustrate adaptations of the present invention which are particularly favorable for multi-valve operation. One set of valves is timed for economy, and remains in constant operation. A second set of valves is timed for high speeds, providing maximum speed, power and performance. The second set of valves is normally deactivated, but can be activated on demand when needed for acceleration, power and speed. As shown in FIG. 9, an electro-rheological valve 120 is situated in the drain line 118 and can be opened or closed to activate or deactivate the second set of valves as desired. Since the second set of valves is to be completely activated or deactivated, this can be easily accomplished by simply opening or closing the oil supply line 116 with one electric solenoid valve which will control the pressurized oil in the supply line. During normal operation when the high speed valves are not needed, merely cutting off the oil in the supply line 116 and permitting the oil to drain from chamber 108 will keep the engine in the economy mode. Absent oil in chamber 108, the second set of valves will be deactivated. Clutter and lash are avoided since the coil springs in the chamber 108 will urge the members apart. In this way, the engine will operate efficiently at all speeds, and avoid the problems caused by the use of multi-valve arrangements at slow speeds.

FIGS. 16 and 16A illustrate two final embodiments of the present invention. Both embodiments are directed to valve controllers utilizing false tops. Referring to FIG. 16, the valve controller comprises a biased piston 224 located within a hollow valve body 226 forming a chamber 226a containing a false top 230. The piston 224 is retained in position between a fixed upper wall 239 within the chamber by a biasing spring 241. The piston 224 includes a rod 228 which reciprocates into and out of the false top 230 through a hole 239a in fixed upper wall 239. As the piston rod 228 moves into the chamber defined by the false top, the biasing spring contracts. The outside wall of the casing includes a copper band 225 and slip ring 236 for conducting electricity from a contacting brush. The body contains electro-rheological fluid 238. The piston 224 has an electrode 240 comprising a metallic coating covering over its top and sides. An insulated wire 237 conducts electricity from the slip ring 236 to the piston electrode 240 and via the biasing spring 241. The piston itself can be constructed from an insulating or non-conducting material such as ceramic or plastic. Alternatively, the piston can be made of metal and insulated from the piston electrode.

As noted, the piston chamber 226a contains electro-rheological fluid 238 in accordance with the present invention. In operation as the cam 243 rotates, the false top descends downward thus thrusting piston rod 228 into the false top. Electro-rheological fluid is forced from the top portion of chamber 226a around the sides of the piston 224a into the lower portion of the chamber. At the appropriate juncture, the slip ring 236 is electrified. This accordingly electrifies the electrode 240 via wire 237 and spring 241. This creates an electric field on the piston electrode 240 which solidifies the electro-rheological fluid flowing along the sides of the piston 224a. The solidified electro-rheological fluid between the side of the piston 224a and the inside of the casing 226 retards the downward thrust of the tappet 230. Consequently, the valve lifter is thrust downward. It is to be noted that as the false top tappet 230 continues to descend, an electric field is further generated between the electrode coating on the top of the piston member 240 and the fixed wall 239, thus tending to further minimize fluid flow. This further has the effect of solidifying the electro-rheological fluid between the top of the electrode 240 and the fixed wall 239. During the upstroke, the slip ring is deactivated, the piston 224 and the piston rod 228 return to their initial positions.

FIG. 16A is an enhanced embodiment of the apparatus of FIG. 16. This embodiment includes the false top tappet 251 and valve chamber 253. A central biasing spring 255 biases a perforated electrode 259 between the upper wall 257 of the chamber. An upper biasing spring 256 biases the tappet 251 with respect to the top wall of the chamber 257. A lower biasing spring 261 biases the perforated member with respect to the lower wall of the chamber 258. The perforated member 259 effectively divides the valve chamber into an upper chamber 253a and lower chamber 253b. The chamber is filled with electro-rheological fluid 260. The perforated electrode contains an upper rod 262 which extends in to the false top tappet via an aperture 264 in the top chamber wall 257 and a lower rod 262a which extends through an aperture 264a in lower chamber wall 258 through the bottom of the chamber. In this embodiment, an electric conductor 267 conducts an electric signal through spring 261 and to perforated member 259. The plunger 259 of this embodiment is perforated in accordance with the embodiments of FIGS. 4-7A.

In operation, as the cam 265 rotates, the false top tappet 251 is pushed downward until it hits the upper piston rod 262. The continuing rotation pushes the rod 262 and perforated piston downward. Electro-rheological fluid flows through the perforated plunger 259 between the lower 253b and upper portions 253a of the chamber in the manner discussed above with respect to FIGS. 4-7A. The lower rod 262a descends through the aperture 264a in the lower wall of the chamber and through the center of the engine valve spring 272. When the electrodes are activated, the electro-rheological fluid within the perforated piston solidifies preventing further flow and thereby generating a compressive fluid force on the remaining fluid against the lower wall of the chamber 258 and against the valve lifter 270, thus lifting the valve (not shown).

The foregoing invention has been described with reference to the above disclosure. It is to be recognized by those skilled in the art that other embodiments fall within the spirit and scope of the invention and that the true scope of the invention is to be examined with reference to the claims appended hereto.

What is claimed is:

1. An electro-rheological valve controller comprising:
    a generally cylindrical casing holding an electro-rheological fluid;
    a reciprocating tappet attached at one end of the cylindrical casing, said tappet contacting cam means for thrusting said tappet into said casing toward a reciprocating valve lift member;
    a wear strip between said cam means and said reciprocating tappet to alleviate tappet and cam spalling and to provide more convenient maintenance shims;
    a plunger member coupled to said tappet, said plunger being perforated to permit the flow of electro-rheological fluid therethrough;
    a reciprocating valve lift member situated within said casing and separated from said perforated plunger member by said electro-rheological fluid, said lifter member communicating with a value to be lifted; and
    electrode means coupled to said perforated member for generating an electric field within said perforated member such that said electro-rheological fluid within said perforated member solidifies, whereby said plunger applied a compressive force against said reciprocating lift member thereby lifting said valve to be lifted.

2. The electro-rheological valve controller of claim 1 further comprising means for compensating for the volumetric changes in said electro-rheological fluid.

3. The valve controller of claim 1 further comprising one way valve means to facilitate the flow of electro-rheological fluid in said housing during the upstroke.

4. An electro-rheological valve controller which functions as a compression brake comprising:
    a generally cylindrical casing holding an electro-rheological fluid;
    a reciprocating tappet attached at one end of said casing, said tappet in contact with cam means for thrusting said tappet into said casing toward a reciprocating lift member;
    a perforated plunger member coupled to said tappet and permitting the flow of electro-rheological fluid therethrough;
    a reciprocating lift member situated within said casing and separated from said perforated plunger member by a biasing spring and said electro-rheological fluid, said lift member communicating with a valve to be lifted;
    electrode means coupled to said perforated member for generating an electric field within said perforated member such that said electro-rheological fluid within said perforated member solidifies, whereby said plunger applies a compressive fluid force against said reciprocating lift member, which thereby lifts said valve to be lifted; and
    microprocessor means for activating and deactivating said electrodes during compression braking and providing for the precise opening of an exhaust valve near completion of an exhaust stroke.

5. An electro-rheological valve controller comprising:
    a generally cylindrical casing holding a compression fluid;
    a reciprocating tappet attached at one end of the cylindrical casing, said tappet being in communication with cam means for thrusting said tappet into said casing;
    a reciprocating piston member connected to said tappet, said piston member being disposed to thrust into said casing;
    a reciprocating valve lift member situated within said casing and separated from said reciprocating piston member by a biasing spring and said compression fluid, said reciprocating valve lift member being in contact with a valve to be lifted;
    a conduit extending out of said casing for the flow of compression fluid from said casing during a downward thrust of said piston;
    electro-rheological valve means in communication with said conduit for controlling the flow of compression fluid through said conduit so as to impede the flow of compression fluid into said conduit and thereby communicating a compressive force created by said piston member against said reciprocating lift member for lifting a valve;
    wherein said electro-rheological valve means comprises: an oscillating valve member for opening and closing said conduit, said valve member having a cavity containing an electro-rheological fluid; a perforated electrode member located within said valve casing, said valve member oscillating with respect to said perforated electrode member; and means for electrifying said perforated electrode member such that the electro-rheological fluid within said electrode solidifies, thereby locking the position of said valve member relative to said electrode.

6. An electro-rheological valve controller comprising:
    a generally cylindrical casing holding an electro-rheological fluid;
    a reciprocating tappet attached at one end of the cylindrical casing, said tappet being in communication with cam means for thrusting said tappet into said casing;

a reciprocating piston member connected to said tappet, said reciprocating piston member being disposed to thrust into said casing;

a reciprocating valve lift member situated within said casing and separated from said reciprocating piston member by a biasing spring and said electro-rheological fluid, said reciprocating valve lift member being in contact with a valve to be lifted;

a conduit integral to said casing and situated between said piston and said valve lift member for the flow of electro-rheological fluid from said casing during a downward thrust of said piston; and electrode means situated within said conduit for generating an electric field such that said electro-rheological fluid contained within said conduit solidifies, thereby impeding the flow of electro-rheological fluid into said conduit and thereby communicating a compressive fluid force created by said piston member against said reciprocating lift member for lifting a valve.

7. In an internal combustion engine comprising: a generally cylindrical casing holding a hydraulic fluid; a reciprocating tappet attached at one end of the cylindrical casing, said tappet contacting cam means for thrusting said tappet into said casing toward a reciprocating valve lift member; a plunger member coupled to said tappet; and said reciprocating valve lift member situated within said casing and separated from said plunger member by said hydraulic fluid, said lift member communicating with a valve to be lifted;

means for augmenting fluid flow into a compression chamber during a return or "up" stroke, thereby providing rapid refill of said chamber, comprising a one-way passage;

wherein said hydraulic fluid is an electro-rheological fluid, and electrode means are provided, coupled to said one-way passage for generating an electric field within said one-way passage such that said electro-rheological fluid within said one-way passage solidifies.

8. A system for improving the performance of multi-valve engines comprising:

a first set of valves, comprising an intake valve and an exhaust valve, being timed for normal operation at all times;

a second set of valves, timed for maximum performance, acceleration and high speed and power;

means for controlling engine valve operation and thereby activating and operating said second set of valves on demand in order to achieve maximum performance, speed and power;

said controlling means comprising an electro-rheological valve controller in conjunction with processor means for controlling the timing of the activation and operation of said second set of valves.

9. The second set of valves of claim 8 comprising an intake valve.

10. The second set of valves of claim 8 comprising an intake valve and an exhaust valve.

11. The valve controller of claim 8 wherein said processor means comprises generating signals in accordance with the dynamic parameters of the engine to control the timing of operation of said second set of valves in order to maximize speed and power.

12. The system of claim 8 wherein the engine valve controlling means comprises a device for activating and deactivating said second set of valves in conjunction with processor means for controlling the timing of the activation and operation of said second set of valves.

13. The valve controller of claim 12 wherein said processor means comprises generating signals in accordance with the dynamic parameters of the engine to control the timing of operation of said second set of valves in order to maximize speed and power.

14. The multi-valve engine of claim 8 further comprising a wear strip between a cam means and a reciprocating tappet to alleviate tappet and cam spalling and to provide more convenient maintenance shims.

15. The multi-valve engine of claim 8 further comprising means for augmenting fluid flow into a compression chamber during a return or "up" stroke, thereby providing rapid refill of said chamber, comprising a one-way passage.

* * * * *

UNITED STATES PATENT AND TRADEMARK OFFICE
CERTIFICATE OF CORRECTION

PATENT NO.  : 5,103,779
DATED       : April 14, 1992
INVENTOR(S) : Nicholas S. Hare, Sr.

It is certified that error appears in the above-identified patent and that said Letters Patent is hereby corrected as shown below:

Column 9, line 25   "22" should be --22'--

Signed and Sealed this

Twenty-second Day of June, 1993

Attest:

MICHAEL K. KIRK

Attesting Officer        Acting Commissioner of Patents and Trademarks